(12) United States Patent
Petrovic et al.

(10) Patent No.: US 7,977,424 B2
(45) Date of Patent: Jul. 12, 2011

(54) POLYMER CONCRETE AND METHOD FOR PREPARATION THEREOF

(76) Inventors: Zoran Petrovic, Pittsburg, KS (US); Wei Zhang, Pitttsburg, KS (US); Ivan Javni, Pittsburg, KS (US); X. Andrew Guo, Pittsburg, KS (US)

( * ) Notice: Subject to any disclaimer, the term of this patent is extended or adjusted under 35 U.S.C. 154(b) by 348 days.

(21) Appl. No.: 09/928,579

(22) Filed: Aug. 13, 2001

(65) Prior Publication Data
US 2003/0090016 A1    May 15, 2003

(51) Int. Cl.
*C04B 24/26* (2006.01)
*C04B 28/02* (2006.01)
*C08J 3/00* (2006.01)
*C08K 3/00* (2006.01)
*C08L 75/00* (2006.01)
*C08G 18/08* (2006.01)
*C08G 18/28* (2006.01)

(52) U.S. Cl. ............ 524/590; 524/2; 524/4; 524/5; 524/589

(58) Field of Classification Search .......... 524/589, 524/590, 2, 4, 5
See application file for complete search history.

(56) References Cited

U.S. PATENT DOCUMENTS

| | | | |
|---|---|---|---|
| 2,902,388 A * | 9/1959 | Szukiewicz | ............ 427/393.6 |
| 4,228,251 A | 10/1980 | Maekawa et al. | |
| 4,346,050 A | 8/1982 | Trent et al. | |
| 4,371,639 A | 2/1983 | Muszynski | |
| 4,375,489 A | 3/1983 | Muszynski | |
| 4,409,371 A | 10/1983 | Hefner, Jr. | |
| 4,410,686 A | 10/1983 | Hefner, Jr. et al. | |
| 4,500,674 A | 2/1985 | Fontana et al. | |
| 4,611,015 A | 9/1986 | Hefner, Jr. et al. | |
| 4,621,010 A | 11/1986 | Wadsworth | |
| 4,696,839 A | 9/1987 | Renker et al. | |
| 4,730,012 A | 3/1988 | Espeland et al. | |
| 4,737,538 A | 4/1988 | Halper et al. | |
| 4,777,208 A | 10/1988 | Hefner, Jr. | |
| 4,885,072 A | 12/1989 | Harry et al. | |
| 5,017,632 A | 5/1991 | Bredow et al. | |
| 5,037,520 A | 8/1991 | Harry et al. | |
| 5,066,379 A | 11/1991 | Harry et al. | |
| 5,079,050 A | 1/1992 | Harry et al. | |
| 5,384,355 A | 1/1995 | Allen | |
| 5,447,984 A | 9/1995 | Ohama et al. | |
| 5,498,683 A | 3/1996 | Kim | |
| 5,576,378 A | 11/1996 | Kuhlmann et al. | |
| 5,599,857 A | 2/1997 | Allen | |
| 5,725,906 A | 3/1998 | Allen | |
| 5,794,402 A | 8/1998 | Dumlao et al. | |
| 6,034,155 A | 3/2000 | Espeland et al. | |
| 6,048,593 A | 4/2000 | Espeland et al. | |
| 6,107,433 A | 8/2000 | Petrovic et al. | |
| 6,686,435 B1 * | 2/2004 | Petrovic et al. | ............ 528/44 |

FOREIGN PATENT DOCUMENTS
EP     0295763    * 12/1988

* cited by examiner

*Primary Examiner* — Patrick D Niland
(74) *Attorney, Agent, or Firm* — Lathrop & Gage LLP

(57) ABSTRACT

A soy-based polyol is mixed with an isocyanate and aggregate to produce a soy-based polyurethane having superior mechanical properties. The aggregate composition may be varied to obtain different mechanical properties, as can the amount of resin. The resin may be crosslinked using a low molecular weight polyol, such as glycerine, to also improve structural performance. A catalyst may be added to accelerate curing time without reducing structural performance.

73 Claims, 18 Drawing Sheets

POLYMER CONCRETE AND METHOD FOR PREPARATION THEREOF

FIELD OF INVENTION

The present invention pertains to the field of polymer concrete. More specifically a polymer resin is mixed with an aggregate and cured to form durable high strength structures that resist chemical attack. Still more specifically, the polymer concrete is formed using a polyurethane resin including vegetable oil-based polyol and an isocyanate.

BACKGROUND OF THE INVENTION

Concrete is used for a variety of different purposes, such as road and building construction. It is especially common for buildings that are used for industrial purposes to have concrete flooring. Unfortunately, concrete made from conventional lime-containing cement is not well suited for use in structures that are exposed to high acidity, chemical leaching attack, or other harsh conditions. For example, in milk pasteurization plants, swimming pools, and other environments where acidic chemicals are present, the concrete made from conventional lime-containing cement degrades rapidly under conditions of normal use. Conventional concretes also suffer the problem of having long curing times. Conventional curing accelerators, such as calcium additives, often have the effect of reducing structural strength in the cured concrete. Various attempts have been made to provide concrete additives, such as polymers, that impart resistance to chemical attack and accelerate the time to cure.

Concretes incorporating polymeric additives, such as latex, vinyl esters, and polyester polymers, are known. For example, U.S. Pat. No. 5,576,378 describes a cement additive that may be mixed with lime mortar to comprise from 70 to 99 parts by weight of the cement-polymer mixture. The additive includes mono-unsaturated aromatic monomers, aliphatic conjugated diene monomers, esters of (meth)acrylic acid monomers, and monoethylenically unsaturated carboxylic acid monomers including the anhydride esters, amides, and imides thereof.

U.S. Pat. No. 4,777,208 describes the use of a polyester amide resin that may be mixed with an aggregate to form a polymer concrete which does not contain conventional lime mortar. The polyester amide variety of polymer concrete has not achieved widespread commercial use, in part, because of poor strength-to-cost performance. Additional strength may be obtained by adding additional resin, but the resin is the most expensive part of the admixture. The cost/performance analysis often results in another option meeting the performance design criteria more economically.

Polyurethanes are polyester amides, and conventional textbook reaction chemistry for producing polyurethanes involves reacting a polyol with an isocyanate, especially a dihydroxy alcohol with a diisocyanate. Polyurethane resin formulations have different contents corresponding to whether the polymerized composition is intended to be a fiber, a coating for concrete or the like, an elastomer, or a foam. For example, in foaming applications, a polyether, such as propylene glycol, may be treated with a diisocyanate in the presence of water and a catalyst, e.g., an amine or a tin compound. The water reacts with the isocyanate groups to provide crosslinking and also evolves carbon dioxide gas resulting in a foamed polymer.

Due to the cost/performance considerations mentioned above, polyurethanes are more commonly accepted for use as flooring sealants than as additives to concrete. A typical sealant may be formed, for example, by reacting a mixture of toluene and 4,4'-diphenyl-methane diisocyanates with a polyol. It is particularly problematic that, upon curing, these polymers generate potentially hazardous volatile organic compounds (VOCs) or vapor pollutants. Both the polyol and the diisocyanate contribute to the vapor pollution problem.

U.S. Pat. No. 6,107,433, which is hereby incorporated by reference to the same extent as though fully replicated herein, describes advancements in the art of polyurethane chemistry through the use vegetable oil-based polyols. The materials are less harmful to the environment than prior polyols in use, and they originate from renewable plant resources, such as soybean plants and the like. Vegetable oil-based polyols are formed by reacting a peroxyacid with vegetable oil to form an epoxy group. The epoxidized vegetable oil is added to a mixture of alcohol, water, and a catalytic amount of fluoboric acid to yield a vegetable oil-based polyol.

The polyol is optionally reacted with an isocyanate to yield a polyurethane. In forming the polyurethane, the isocyanate reacts with the hydroxyl groups of the vegetable oil-based polyol. The vegetable oil-based polyol and the isocyanate are combined in approximately stoichiometric quantities. It is acceptable to use up to about 10% in excess of the stoichiometric quantity of either of these components. A filler, such as silica, alumina, calcium carbonate, dolomite, silicates, glass, ceramics, clay, and talc may be added to the reaction mixture in amounts ranging from about 1% to 200% by weight of the vegetable oil-based polyol to form cast electroinsulators. Large amounts of filler are recommended, in order to enhance the electroinsulating properties of the cast resin. The vegetable oil-based polyurethanes have not heretofore been considered for use in polymer concretes.

It remains a problem in the art that there are no methods and materials available for forming polymer concretes, and particularly polyurethane concretes, from naturally occurring and renewable materials. It is a further problem that existing polyester amide concretes are not widely used due, at least in part, to poor cost performance.

SUMMARY OF THE INVENTION

The present invention overcomes the problems outlined above by providing polyurethane concretes that incorporate polyols derived from naturally occurring and renewable sources. These polyols have a higher hydroxyl number than the conventional triols used in forming polyurethanes. The additional hydroxyl moieties result in the cured resin having improved structural properties, which can be further improved by the addition of a crosslinker, such as a low molecular weight polyol. In combination, these factors provide improved cost/performance of the resins in polymer concrete applications, such that low-cost polyurethane concretes can now be practically used on a widespread basis with fewer deleterious environmental effects than would occur from other polymer resins.

The polymer concrete is normally formed as a composition comprising a cured polyurethane resin bonded to an aggregate composition. The cured polyurethane resin is formed as a reaction product from a reaction mixture including at least one vegetable oil-based polyol, and at least one isocyanate having at least two isocyanate moieties per molecule. The cured polyurethane resin is preferably present in an amount ranging from 10% to 30% by weight of the polymer concrete composition.

The physical qualities of the vegetable oil-based polyol used to form the resin varies depending upon the plant source from which the polyol is derived and the degree of hydroxylation that is imparted to the vegetable oil via unsaturation. The process of hydroxylation is preferably as taught in U.S. Pat. No. 6,107,433, which entails reacting the vegetable oil with a peroxyacid to form an epoxy group followed by addition of the epoxidized vegetable oil to a mixture of alcohol, water, and a catalytic amount of fluoboric acid. It is preferred to have a polyol with sufficient unsaturation by these processes to impart on average three or more hydroxyl moieties per polyol molecule. A more preferred level of hydroxylation results in a ratio of 3.9 or even four hydroxyl groups per polyol molecule in an essentially unsaturated soy-based polyol. Other suitable vegetable oil-based polyols, for example, comprise unsaturated derivatives of vegetable oils selected from the group consisting of safflower oil, linseed oil, corn oil, sunflower oil, canola oil, cottonseed oil, rapeseed oil, tung oil, peanut oil, and mixtures thereof.

The hydroxyl number, or OH number, of the vegetable oil-based polyol is a good basis for comparing the potential usefulness of various vegetable oil-based polyols for the purposes described herein. The hydroxyl number is determined according to conventional practices involving titration with potassium hydroxide and expressed as milligrams of KOH per gram of polyol. Preferred polyols, and especially preferred soy polyols, have characteristic hydroxyl number ranging from 180 to 260, an epoxy number ranging from 0.02% to 0.03%, and a viscosity less than 15 pascal-seconds. The hydroxyl number may be supplemented by addition of low molecular weight polyols, especially low percentages of polyols derived from naturally occurring renewable sources, to raise the hydroxyl number above that which is obtainable from the vegetable oil-based polyol alone. Naturally occurring low molecular weight polyols, such as glycerine, are optionally and preferably used for this purpose. The low molecular weight polyols generally provide improved structural performance by acting as crosslinking agents. Without the low molecular weight polyols, the vegetable oil-based polyol most preferably has a hydroxyl number ranging from 205 to 210.

The isocyanate in the admixture used to form the polymer concrete is preferably a diisocyanate, though other polyisocyanates are useful. The isocyanate in the admixture preferably comprises a stoichiometric excess amount of the isocyanate moieties in comparison to hydroxyl moieties in the vegetable oil-based polyol. The ratio of isocyanate moieties in the isocyanate to hydroxyl moieties in the vegetable oil-based polyol preferably ranges from 1.02 to 1.15, more preferably from 1.05 to 1.10, and is most preferably 1.05.

The aggregate composition is generally a material that costs less than the polyurethane resin and which is capable of being bound in place by the cured polyurethane resin. It is generally contemplated that the aggregate composition will be mineral, ceramic or glass. Preferred materials include fly ash, lime, sand, pea gravel, crushed rock, and mixtures thereof in any combination. Other aggregates may optionally include such materials as metal fines, glass fibers, synthetic fibers, glass reinforcing mats, glass strands, glass filaments, metal fibers, mineral powders, and mixtures thereof in any combination. For example, an aggregate may be formed of 10% sand and 15% fly ash.

Pea gravel is a particularly preferred aggregate constituent due to its relatively low cost. Structural properties of the polymer concrete composition are generally enhanced when pea gravel comprises 25% or less of by weight of the aggregate composition. On the other hand, sufficient structural strength may be found in mixtures having higher percentages of pea gravel, and hence lower costs, in amounts equal to or exceeding 25%, 50% or even 75% by weight of the aggregate composition.

As indicated above, structural properties of the polymer concrete composition may be improved by adding a crosslinker, especially a low molecular weight polyol, such as glycerine which is a triol. By way of example, most structural properties of the polymer concrete are improved by the addition of glycerine in amounts ranging from 5 parts per hundred to 30 parts per hundred by weight of the vegetable oil-based polyol. For most vegetable oil-based polyols resins, the range for optimal structural improvement by the addition of glycerine normally lies from 15 parts per hundred to 25 parts per hundred by weight of the vegetable oil-based polyol. It is often the case that costs can be minimized by the addition of smaller amounts of glycerine, such as amounts ranging from 1 part per hundred to 10 parts per hundred by weight of the vegetable oil-based polyol, to achieve sufficient structural improvements and meet design strength requirements. Structural performance of these polyurethane resins in concrete, however, is optimal at about 5 parts per hundred.

A catalyst may be added to the reaction mixture optionally as needed in the intended environment of use. For example, the catalyst may be added in an amount effective for adjusting pot life of the reaction mixture to a predetermined value ranging between 10 minutes and 80 minutes at room temperature, or for adjusting gel time of the reaction mixture to a predetermined value ranging between 10 minutes and 70 minutes at room temperature. Organometallic catalysts, especially tin compounds may, for example, be present in an amount up to about 0.4% of the reaction mixture by weight.

The preferred amount of polyurethane resin is preferably a minimum amount that meets the design strength specifications. This amount will often be from 10% to 20% of the polymer concrete composition by weight. Sufficient strength may be found in many instances where the resin content ranges from 10% to 15% of the polymer concrete composition by weight, though minimum amounts using less than about 15% may not fully coat all of the aggregate with resin. Resin contents from 15% to 20% are associated with increased strength that may not be required for all applications.

An especially preferred polymer concrete formulation that incorporates many of the forgoing concepts into one admixture might include, for example:
  (a) 80% to 90% by weight of an aggregate composition;
  (b) 10% to 20% by weight of a polyurethane matrix prepared by contacting (i) a vegetable oil-based polyol having on average at least three hydroxyl groups per molecule, (ii) an isocyanate having on average at least two isocyanate groups per molecule, and (iii) 0 pph to 10 pph of a glycerine crosslinker based upon weight of the vegetable oil-based polyol; and
  (c) 0% to 0.4% of a catalyst by weight of the vegetable oil-based polyol.

Another such preferred composition might comprise:
  (a) 80% to 90% by weight of the composition of an aggregate composition comprising a mixture of (i) sand and (ii) fly ash, silica, lime or mixtures thereof, wherein said aggregate composition contains from 10% to 15% by weight of (ii);

(b) 10% to 20% by weight of a polyurethane matrix prepared by contacting (iii) a soy-polyol, (iv) an isocyanate having at least two —NCO groups per molecule, and (v) from 5 pph to 10 pph by weight of the soy polyol of glycerin, wherein the ratio of equivalents of —NCO to equivalents of —OH is about 1.05 to about 1.10; and (c) about 0.1% to about 0.4% by weight of the soy polyol of a catalyst.

These ingredients are mixed according to a method preparing a polyurethane concrete from a vegetable oil-based polyol. The vegetable oil-based polyol is admixed with the isocyanate and aggregate compositions as described above. The resultant admixture may be exposed to vacuum to remove gas pockets for optimun strength mixtures. Alternatively, a small amount of water, e.g., up to 2% by volume of the resin, may be added to the reaction mixture to enhance the degree of contact between the resin and the aggregate by foaming of the polyurethane resin.

The results shown herein facilitate a method of manufacturing a concrete structure. The method comprises the steps of receiving design criteria that set forth structural specifications of concrete to be used in the concrete structure, consulting a specifications for structural performance of soy-based polyurethane concrete based upon contents of the soy-based polyurethane concrete, selecting a composition of soy-based polyurethane concrete that meets the design criteria, constructing the structure with use of the composition. The design criteria may, for examples, be selected as any combination from the group consisting of cost, compressive strength, tensile strength, and flexural strength. Alternatively, the design criteria may be selected from the group consisting of density and abrasion resistance or other factors. The specifications, for example, may be selected as any combination from the group consisting of resin content, aggregate content, amount of crosslinker, and aggregate composition. Structures that may be produced according to this method may comprise, for example, pouring a floor in an industrial setting or an agroindustrial setting, such as a dairy. Alternatively, structures may include, for example, swimming pools, housing, or transportation structures, such as a bridge or road repair

OBJECTS OF THE INVENTION

Accordingly, an object of the present invention is to provide a polymer concrete that incorporates using a vegetable oil-based polyol.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

DETAILED DESCRIPTION OF THE PREFERRED EMBODIMENTS

Figure 1:
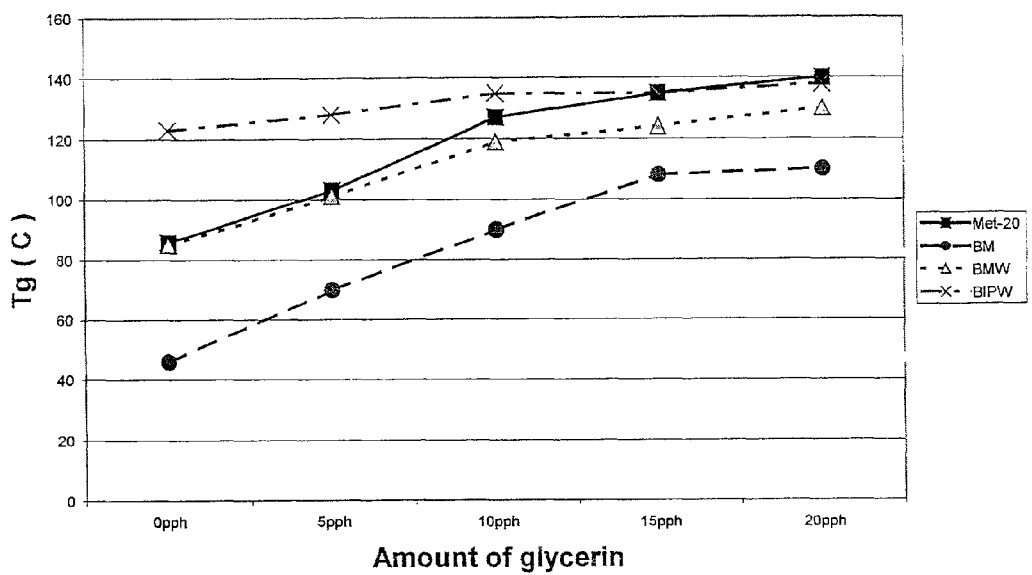
FIG. 1 is a plot of glass transition temperature, Tg in degrees celsius, for four cast polyurethane resins prepared from the four soy-polyols in Examples 1-5.

The following detailed description is intended to demonstrate preferred materials and practices for use in practicing various instrumentalities of the vegetable oil-based polyurethane polymer concretes and associated methodology. As such, it should be understood that the following discussion teaches by way of example, and not by limitation.

There is now shown a polymer concrete that is formed as a cured polyurethane resin bonded to an aggregate composition. The cured polyurethane resin is a reaction product from a reaction mixture including at least one vegetable oil-based polyol, and at least one isocyanate having at least two isocyanate moieties per molecule. The polyurethane resin cures or hardens by way of a chemical reaction in which the isocyanate reacts with the hydroxyl groups of the vegetable oil-based polyol. The cured polyurethane resin is preferably present in an amount ranging from 10% to 30% by weight of the polymer concrete composition. The balance of the polymer concrete composition is preferably an aggregate mixture, and small amounts of other ingredients such as pigments, drying agents, water, and reaction catalysts may optionally be added for various purposes, as explained below.

Preferred methods and materials for use according to the instrumentalities described herein include, for example, the methods and materials for making vegetable oil-based polyurethanes that are described in U.S. Pat. No. 6,107,433. As indicated above, vegetable oil-based polyols are formed by reacting a vegetable oil with a peroxyacid to form an epoxy group followed by addition of the epoxidized vegetable oil to a mixture of alcohol, water, and a catalytic amount of fluoboric acid. It is presently preferred to have a polyol with sufficient unsaturation by these processes to impart on average three or more hydroxyl moieties per polyol molecule. A more preferred level of hydroxylation results in a ratio of 3.9 or even four hydroxyl groups per polyol molecule in an essentially unsaturated soy-based polyol.

Higher levels of unsaturation increase the viscosity of the polyol. Higher viscosities are generally associated with increasingly undesirable mixing properties. undesirable. The hydroxyl number of the polyol may be adjusted so that the preferred initial viscosity of a mixture including the polyol component and the isocyanate component ranges from 6,000 MPas to 10,000 MPas (CT). The viscosity may be reduced or thinned as needed to achieve uniform mixing of the resin with the aggregate by the addition of a low molecular weight polyol, such as glycerine, which also advantageously acts as a crosslinker and increases the overall hydroxyl number of the polyol. The crosslinker is preferably glycerin added in an amount equal to at least about 5 pph by weight of the polyol because this small amount of glycerine results in significant structural property improvements. Other crosslinkers may be used as long as suitable properties are achieved, including suitable glass transition temperature (Tg), flexular strength, tensile strength, and hardness. The polyol mixture including the optional crosslinker is reacted with a polyisocyanate in the presence of an optional catalyst to form a polyurethane.

In addition to the subject matter disclosed in U.S. Pat. No. 6,107,433, the present instrumentalities further comprise the formation of polyurethane polymer concretes that are suitable for use, by way of example, as chemically resistant flooring materials in industrial and agricultural structures. Polymer concretes that are constructed according to these principles demonstrate surprisingly significant strength, resistance to chemicals, and improved glass transition strength in comparison to prior polyurethane polymer concrete compositions. These advantages are obtained by mixing the polyurethane resin with an aggregate mixture in the proportions described below. One reason for the observed improvements in polymer concrete properties derives from the increased hydroxyl moiety content in vegetable oil-based polyols, which are typically tetrols, as opposed to the triols and diols that are normally used in polyurethane resins. In addition to imparting improved structural properties, vegetable oil-based polyols have a relatively low cost in comparison to other polyols. This circumstance lends itself well to high volume uses, such as in building construction.

Polyurethane compounds based on vegetable oil-based polyols have numerous advantages over other polyols that may be considered for use in alternative polymer concrete compositions. For example, vegetable oil-based polyols have a higher thermal stability both in air and nitrogen than corresponding polyurethane compounds based on polypropylene oxide (PPO) polyols. Vegetable oil-based polyurethane compounds have better hydrolytic stability and lower absorption of water than corresponding PPO-based compounds. Still further, vegetable oil-based polyurethane compounds have several orders higher bulk and surface resistivity than amine or anhydride cured epoxy resins.

Structural properties and mixing properties of the resin may be improved by adding a low molecular weight polyol, such as glycerine, which has been shown to improve structural properties in amounts ranging between 0% and 30% by weight of the resin. A low molecular weight polyol is defined as a polyol having a molecular weight less than one-half of the molecular weight of the vegetable oil-based polyol. Glycerine is preferred because it is a naturally occurring material that, like the vegetable oil-based polyols, is less harmful to the environment than alternative polyols. Glycerine is also preferred because it is a triol, which enhances its crosslinking effect.

The vegetable oil-based polyol and the isocyanate are preferably combined in approximately stoichiometric quantities, but structural properties of the cured polymer concrete composition are improved when the isocyanate in the admixture preferably comprises a stoichiometric excess amount of the isocyanate moieties in comparison to hydroxyl moieties in the vegetable oil-based polyol and crosslinking agent. The ratio of isocyanate moieties in the isocyanate to hydroxyl moieties in the vegetable oil-based polyol preferably ranges from 1.02 to 1.15, more preferably from 1.05 to 1.10, and is most preferably 1.05. Examples of isocyanates that can be used include, but are not limited to, polymeric or crude diphenylmethane diisocyanate (MDI), modified MDI including hydrogenated MDI (HMDI), isophorone diisocyanate, and 2,4-toluene diisocyanate (TDI). HMDI is non-aromatic and can be used where light stability, arc and tracking resistance are required. A particularly preferred isocyanate, PAPI 2901, which is available from Dow Chemicals, Midland, Mich. 48674, is an example of a polymeric or crude MDI that may be used. Isonate 2143 L, which is available from Dow Chemicals, is an example of a non-polymeric MDI that may be used. The selection of the isocyanate component, especially at to the number of isocyanate moieties, affects the degree of crosslinking within the cured polyurethane.

Still further, a drying agent or an antifoaming agent may be added to the polyurethane, as desired. A drying agent is recommended for use in high strength concretes because polyurethanes are very sensitive to moisture and tend to foam if not dried. An example of a drying agent that may be used is a zeolite paste such as Baylith L Paste, which is comprised of a 50% dispersion of zeolite in castor oil and may be obtained from Bayer Corp., 100 Bayer Road, Pittsburgh, Pa. 15205. A zeolite drying agent is the most preferred drying agent for polyurethane reactions. Nonreactive additives such as pigments may also be added when forming the polyurethane resin, but these additives are considered to be part of the aggregate mixture.

The polyurethane resins of the present invention can be cured at room temperature. Higher temperatures accelerate the curing process and avoid the use of a catalyst. The viscosity of the polyurethane is reduced at higher curing temperatures and, consequently, gas evacuation from the compound is facilitated. The removal of air provides a denser cured resin and results in a final product having a higher glass transition point.

Curing of the polymeric concrete can be accomplished by exposing the uncured resin to ambient conditions, adding a catalyst, or by exposing to elevated temperatures. Use of a catalyst, such as an amine, organotin or organomercurial material in amounts recommended by the manufacturer, is preferred because it accelerates curing of the resin and because elevated temperatures are difficult or impossible to maintain in the intended environments of use. The catalyst will be added to the polyol along with the isocyanate. It should be noted that after the passage of time, the cured concretes will have similar qualities regardless of whether a catalyst was added or enhanced temperatures were used.

Where high strength is needed, the polyol and the aggregate composition are preferably dried before being mixed together. The polyol component is optionally but preferably mixed with an approximately stoichiometric amount of an isocyanate under vacuum conditions at about 40-60° C. for about 5 minutes or until foaming stops. This removes trapped air. A catalyst is optionally but preferably added during this mixing process. The resultant resin, the aggregate and the other optional additives should then be mixed while the resin is still hot so as to form an uncured cement mixture that will harden over time.

The aggregate composition is generally a material that costs less than the polyurethane resin and which is capable of being bound in place by the cured polyurethane resin. It is generally contemplated that the aggregate composition will be mineral, ceramic or glass. Preferred materials include fly ash, lime, sand, pea gravel, crushed rock, and mixtures thereof in any combination. Other aggregates may optionally include such materials as metal fines, glass fibers, synthetic fibers, glass reinforcing mats, glass strands, glass filaments, metal fibers, mineral powders, and mixtures thereof in any combination. For example, an aggregate may be formed of 10% sand and 15% fly ash.

Pea gravel is a particularly preferred aggregate constituent due to its relatively low cost. Structural properties of the polymer concrete composition are generally enhanced when pea gravel comprises 25% or less of by weight of the aggregate composition. On the other hand, sufficient structural strength may be found in mixtures having higher percentages of pea gravel, and hence lower costs, in amounts equal to or exceeding 25%. 50% or even 75% by weight of the aggregate composition.

Where high structural strength is less important and the cost of the polymer concrete mixture is a factor for consideration, the total amount of resin may optionally be reduced down to ten percent or less by weight of the mixture by adding a foaming agent, such as water, to the mixture. The amount of water may vary depending upon the desired strength, but amounts of water up to two percent by weight of the resin are contemplated as being within acceptable limits for low strength applications. The advantage of foam the resin is that the foam occupies a larger volume than does the unfoamed resin and, consequently, reduced amounts of resin, e.g., less than fifteen percent by weight of the polymer concrete mixture, are able to fully coat the aggregate resulting in improved overall structural properties. Increased amounts of water may be added in amounts up to two percent or more, especially where the amount of resin comprises less than ten percent of the polymer concrete composition by weight. For example, a water-permeable foam may be created by using five percent resin by weight of the aggregate mixture where the resin mixture comprises three percent water. Other resin contents of less than ten percent by weight of the polymer mixture may be utilized, with or without foaming, where it is desired for the polymer concrete composition to be permeable to water, such as is needed when placing a polymer concrete barrier around shrubbery or a tree.

Various alternatives for curing the concrete may be followed as part of the method, including adding a catalyst to the polyol/isocyanate mixture or allowing the concrete to cure over a period of time. The resultant polymeric concrete is advantageous because it demonstrates excellent flexural modulus, glass transition temperature, tensile strength, compressive strength, impact strength, and hardness. The resultant polymeric concrete is well suited for use in road repairs, such as patching holes and flooring used in a chemically aggressive environment.

EXAMPLE 1

Preparation of Soy Polyols

A variety of soy-polyols were produced by methods taught in U.S. Pat. No. 6,107,433 by varying the degree of hydroxylation. Such polyols are all suitable for use in forming the polyurethane matrix. For convenience, the resins are labeled MET-20, BM, BMW, and BIPW. Each polyol has different characteristics as shown in Table 1 below.

TABLE 1

| General Properties Of The Soy Polyols | | | | |
|---|---|---|---|---|
| Soy Polyol | OH#[1] (mg KOH/g) | Epoxy Number[2] (%) | Viscosity[3] (Pa·s) | Color |
| Met-20 | 208 | 0.03 | 11.0 | light yellow |
| BM | 180 | 0.02 | 4.9 | light yellow |
| BMW | 207 | 0.028 | 13.3 | light yellow |
| BIPW | 256 | 0.028 | 26.0 | light yellow |

[1]Hydroxyl number - measures of the amount of reactive hydroxyl groups available for reaction. This value is determined by a wet analytical method according to ASTM D 4274-88 and reported as the number of mg of potassium hydroxide equivalent to the hydroxyl groups found in one gram of the sample.
[2]Epoxy number measures epoxy content and is determined according to ASTM D 1652 using titration with HBr.
[3]Viscosity is determined through use of the Controlled Stress Rheometer from Rheometrix.

The soy-polyol known as BMW is preferred for its mixing properties, which are associated with relatively low viscosity, as well as superior structural performance in the polymer concretes. The total OH# for these various polyols ranges between about 180 and about 260, where the preferred BMW polyol has an OH# ranging between about 180 and about 210. More preferably, a soy-polyol having an OH# ranging between about 205 and about 210, particularly about 208, will be used. Other soy-polyols may be used as long as the polyol has a suitable number of hydroxyls The following examples contain experimental results that share various methodologies. Samples of polymer concrete were prepared by mixing the reported ingredients and pouring the ingredients into molds, which produced hardened samples. The hardened samples for use in the compressive strength and tensile strength tests were formed as cylinders measuring 1 inch in diameter and 2 inches in length. The samples for the flexural strength test were blocks of 5 inches in length, ¾ inch in width, and ½ inch in thickness.

The tests for compressive strength were conducted using a CARVER press Model 3891.4PR1A00 according to ASTM C 39-94. The tests for splitting tensile strength were also conducted using a CARVER press Model 3891.4PR1A00 according to ASTM C 496-90. The test for flexural strength was conducted using an INSTRON tester Model 4467 according to ASTM C 293-94.

The tests for compressive strength were performed by placing the cylindrical test specimen into the press in a vertically elongated position. Force was applied on the test specimen to press it until the test specimen was crushed. The value of the force loaded on the test specimen when it crushed was read. The compressive strength was calculated as follows:

Compressive strength=$p/(r^2\pi)$, where p=applied load force when specimen was crushed
r=radius of the test specimen The splitting tensile strength tests were performed by placing the cylindrical test specimen on the press in a horizontal position or flattened configuration with two small wooden bars at the bottom and top of the specimen. Force was applied on the specimen to press it until the specimen was broken. The value of the force loaded on the specimen when the specimen broke was read. The splitting tensile strength was calculated as follows:

Splitting tensile strength=$2p/\pi l d$, where:

p=applied load force when specimen broke
l=length of the test specimen
d=diameter of the test specimen Flexural strength was calculated using a three point bending test. The test specimen was placed on two supports. Force was applied using a loading nose to the middle of the specimen until the specimen broke. The value of the force loaded on the specimen when it broke was read. The flexural strength was calculated as follows:

Flexural strength=$3pl/2bd^2$, where p=applied load force when specimen broke
l=support span
b=width of the specimen
d=thickness of the specimen (depth of the beam)

The glass transition temperature ($T_g$) tests were performed using conventional practices involving differential scanning calorimetry and, alternatively, a thermal mechanical analyzer to approximate the glass transition temperature. Unless otherwise specified, the thermal mechanical analyzer test results are reported.

Tests for Shore D Hardness were performed using an instrument from Paul N. Gardner Company, Inc. The Shore D hardness test is used to provide a relative hardness measurement. The resultant Shore D hardness numbers, although useful in providing a comparison between the respective concretes, are designed for measuring hard rubbers. No assertion is made that the reported Shore D hardness measurements can be compared to harness in actual rubbers. The measurements merely provide a relative hardness scale that is useful in comparing the hardness of polymer concretes.

Density measurements were performed according to ASTM D792 by volumetric displacement of liquid and measured weight change.

Except where specified, all references to percent (%) and pph are on a weight basis.

In Examples 2-5, four series of cast polyurethane (PU) samples were prepared using the four different soy-polyols that are described in Example 1 including the Met-20, BM, BMW, and BIPW polyols. The samples were tested to determine the preferred soy-polyol. In each series of samples, different amounts of glycerin (as a crosslinker) was added in order to analyze the effects of different crosslinker density on properties of cast polyurethane samples.

EXAMPLE 2

Structural Properties of MET20 Polyol Resins

Eight cast polyurethane samples formed from soy-polyol Met-20 were prepared with different amounts of glycerin. The equivalent ratios of Met-20 and glycerin, expressed as parts per hundred by weight of the polyol, were:
  10/0 (0 pph glycerin, total OH#=208);
  9/1 (1.3 pph glycerin, total OH#=229);
  8/2 (2.8 pph glycerin, total OH#=252);
  7/3 (4.9 pph glycerin, total OH#=284);
  6/4 (7.6 pph glycerin, total OH#=322);
  5/5 (11.3 pph glycerin, total OH#=373);
  4/6 (17.1 pph glycerin, total OH#=444); and
  3/7 (26.5 pph glycerin, total OH#=548).

Aliquots of the eight MET20 polyol-glycerine mixtures described above were placed in a container and charged with PAPI® 2901 a polymeric methylene diphenyl diisocyanate (PMDI) from The Dow Chemical Company to provide an NCO/OH equivalent ratio of 1:1 in the resin mixture. The reagents were mixed to homogeneity for two to three minutes. Air bubbles were removed by applying vacuum to the closed container for two to three minutes. The contents of the container were then poured into a mold and the mold placed in an oven and held at 110° C. overnight for approximately twelve hours. The properties of the eight Met-20 cast polyurethane samples were determined according to the procedures described above and are shown in Table 2 below.

TABLE 2

Properties Of Cast Resin Based On Met-20 Polyol

| Glycerin content (pph) | Tg (TMA, ° C.) | Tg (DSC, ° C.) | Flexural Modulus (Mpa) | Tensile Strength (Mpa) | Compressive Strength (Mpa) | Impact Strength (ft/inch) | Hardness (Shore D) |
|---|---|---|---|---|---|---|---|
| 0 | 85 | 86 | 1339 | 39 | 118 | 0.12 | 80 |
| 1.3 | 92 | 89 | 1489 | 39 | 123 | 0.10 | 81 |
| 2.8 | 107 | 94 | 1550 | 42 | 125 | 0.19 | 82 |
| 4.9 | 125 | 103 | 1647 | 45 | 126 | 0.13 | 83 |
| 7.6 | 135 | 118 | 1943 | 49 | 132 | 0.15 | 84 |
| 11.3 | 139 | 132 | 2073 | 50 | 140 | 0.14 | 85 |
| 17.1 | 147 | 137 | 2098 | 64 | 148 | 0.16 | 86 |
| 26.5 | 159 | 146 | 2106 | 63 | 149 | 0.07 | 87 |

As can be seen, the sample without added glycerin had the lowest glass transition temperature, hardness, and lowest mechanical strength. The samples with moderate amounts of glycerin yielded better mechanical strengths, higher glass transition temperatures and hardness (except impact resistance). Samples with the highest amount of added glycerin produced the highest glass transition temperature, highest hardness, and best mechanical properties.

EXAMPLE 3

Structural Properties of BM Polyol Resins

Eight cast resin samples were prepared using the soy-polyol BM that is described in Example 1, in combination with different amounts of glycerine. The equivalent ratios of BM polyol and glycerin were:
  10/0 (0 pph glycerin, total OH#=181);
  9/1 (1.1 pph glycerin, total OH#=199);
  8/2 (2.5 pph glycerin, total OH#=221);
  7/3 (4.2 pph glycerin, total OH#=248);
  6/4 (6.6 pph glycerin, total OH#=283);
  5/5 (9.9 pph glycerin, total OH#=329);
  4/6 (14.8 pph glycerin, total OH#=394); and
  3/7 (23.1 pph glycerin, total OH#=490).

Aliquots of the eight BM cast samples were mixed with an equivalent isocyanate moiety from PAPI® 2901 and hardened in an identical manner with respect to the cast resins of Example 2. The structural properties of each BM resin were determined according to the procedures described above and are shown in Table 3 below.

TABLE 3

Properties of Cast Resin Based On BM Polyol

| Glycerin content (pph) | Tg (TMA, °C.) | Tg (DSC, °C.) | Flexural Modulus (Mpa) | Tensile Strength (Mpa) | Compressive Strength (Mpa) | Impact Strength (ft/inch) | Hardness (Shore D) |
|---|---|---|---|---|---|---|---|
| 0 | 46 | 46 | 674 | 20 | 78 | 0.49 | 75 |
| 1.1 | 48 | 55 | 928 | 31 | 89 | 0.44 | 78 |
| 2.5 | 60 | 54 | 1306 | 39 | 105 | 0.33 | 80 |
| 4.2 | 66 | 61 | 1528 | 42 | 133 | 0.44 | 82 |
| 6.6 | 78 | 83 | 1859 | 49 | 142 | 0.86 | 84 |
| 9.9 | 90 | 101 | 2103 | 55 | 173 | 0.57 | 85 |
| 14.8 | 106 | 100 | 2166 | 62 | 182 | 0.45 | 86 |
| 23.1 | 116 | 125 | 2476 | 63 | 206 | 0.49 | 87 |

The lower OH# of soy-polyol BM is generally responsible for lower Tg, lower flexural modulus, lower hardness, and lower mechanical strength. By adding glycerin as an additional crosslinker, it was observed that these properties were improved. Among the eight samples, the best properties were displayed by the sample with the highest amount of added glycerin.

EXAMPLE 4

Structural Properties of BMW Polyol Resins

Five cast resin samples were formed using the soy-polyol resin BMW that is described in Example 1, in combination with different amounts of glycerine. The relative amounts of BMW polyol and glycerin were:
 0 pph glycerin (total OH#=207);
 5 pph glycerin (total OH#=289);
 10 pph glycerin (total OH#=359);
 15 pph glycerin (total OH#=423); and
 20 pph glycerin (total OH#=482).
 Aliquots of the eight BM cast samples were mixed with an equivalent isocyanate moiety from PAPI® 2901 and hardened in an identical manner with respect to the cast resins of Example 2. The structural properties of each BM resin were determined according to the procedures described above and are shown in Table 4 below

TABLE 4

Properties Of Cast polyurethane Samples Based On Polyol BMW

| Glycerin content (pph) | Tg (DSC, °C.) | Flexural Modulus (Mpa) | Tensile Strength (Mpa) | Compressive Strength (Mpa) | Hardness (Shore D) |
|---|---|---|---|---|---|
| 0 | 85 | 1417 | 34 | 121 | 81 |
| 5 | 101 | 1938 | 51 | 131 | 84 |
| 10 | 119 | 2129 | 53 | 138 | 85 |
| 15 | 124 | 2392 | 60 | 160 | 85 |
| 20 | 130 | 2273 | 59 | 193 | 87 |

Due to similar hydroxyl numbers, the cast sample made from the BMW polyol without adding glycerin resulted in a sample that exhibited properties similar to the properties of the Met-20-based cast sample. The properties of the BMW sample were improved by the addition of glycerin. Among these five samples, the sample made with 20 pph glycerin had the highest Tg, hardness, and compressive strength. Flexural modulus and tensile strength, however, were slightly lower than the sample made with 15 pph glycerin. It is hypothesized that this result may be due to errors in the testing or sample preparation.

EXAMPLE 5

Structrual Properties of BIPW Resins

Five cast resin samples were formed using the soy-polyol resin BIPW that is described in Example 1, in combination with different amounts of glycerine. The relative amounts of BMW polyol and glycerin were:
 0 pph glycerin (total OH#=256);
 5 pph glycerin (total OH#=331);
 10 pph glycerin (total OH#=399);
 15 pph glycerin (total OH#=461); and
 20 pph glycerin (total OH#=518).
 Aliquots of the eight BM cast samples were mixed with an equivalent isocyanate moiety from PAPI® 2901 and hardened in an identical manner with respect to the cast resins of Example 2. The structural properties of each BM resin were determined according to the procedures described above and are shown in Table 5 below.

TABLE 5

Properties Of Cast Samples Based On Polyol BIPW

| Glycerin content (pph) | Tg (DSC, °C.) | Flexural Modulus (Mpa) | Tensile Strength (Mpa) | Hardness (Shore D) |
|---|---|---|---|---|
| 0 | 85 | 1417 | 34 | 81 |
| 5 | 101 | 1938 | 51 | 84 |
| 10 | 119 | 2129 | 53 | 85 |
| 15 | 124 | 2392 | 60 | 85 |
| 20 | 130 | 2273 | 59 | 87 |

Comparing the cast samples made without glycerin with the first three soy-polyols of Examples 2-4, it is observed that the BIPW-based sample made without glycerin had the highest Tg, tensile strength, flexural modulus, and hardness. This is likely due to the high OH# (256 mgKOH/g). The properties of BIPW-based samples were further improved by the addition of glycerin.

Examples 2-5 uniformly show that the highest concentrations of glycerin generally improve structural properties of the cast resins. In some instances, as is apparent from FIGS. 1-16, the use of glycerine in high concentrations may result in a plateau or even a slight diminishment with regard to some structural properties while other properties continue to improve. The issue of how much glycerine to add is not necessarily a function of optimizing the structural strength of the cured resin so much as it is a consideration of how much glycerine, a relatively high cost component, should be added to achieve design strength requirements.

The selection of the preferred polyol for formation of polymer concrete was based on the overall properties observed in the cast resins and the observed Theological mixing properties of the liquid state resins with aggregates. As such, the polyol that resulted in good properties in the cast resin was considered for the application in the concrete. Thus, it was determined that the proper polyol for making the polymer concrete should result in a cast resin with acceptable properties and a relatively low viscosity.

Figure 2:
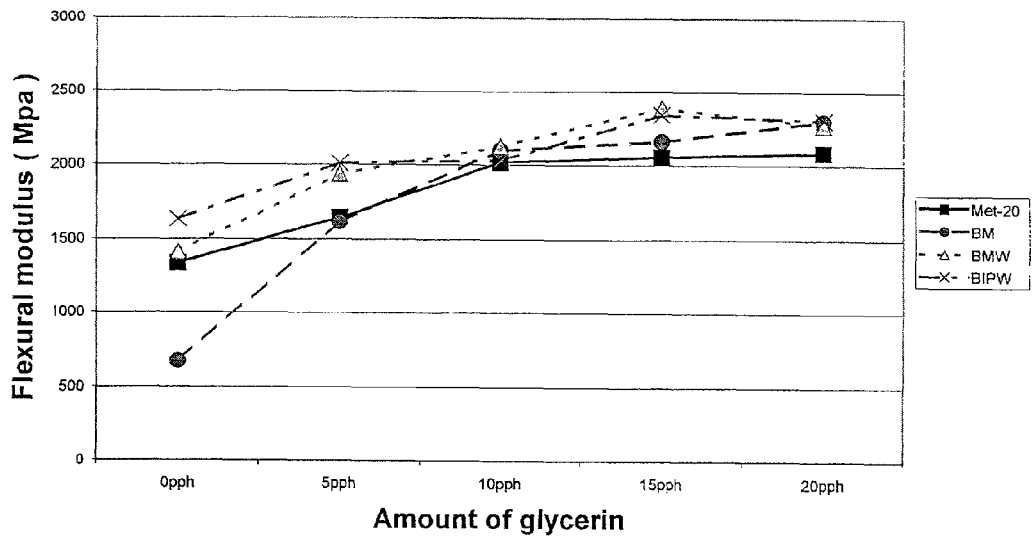
FIG. 2 is a plot of flexural modulus in Mpa for the cast polyurethane resins prepared from the four soy-polyols in Examples 1-5.
Figure 3:
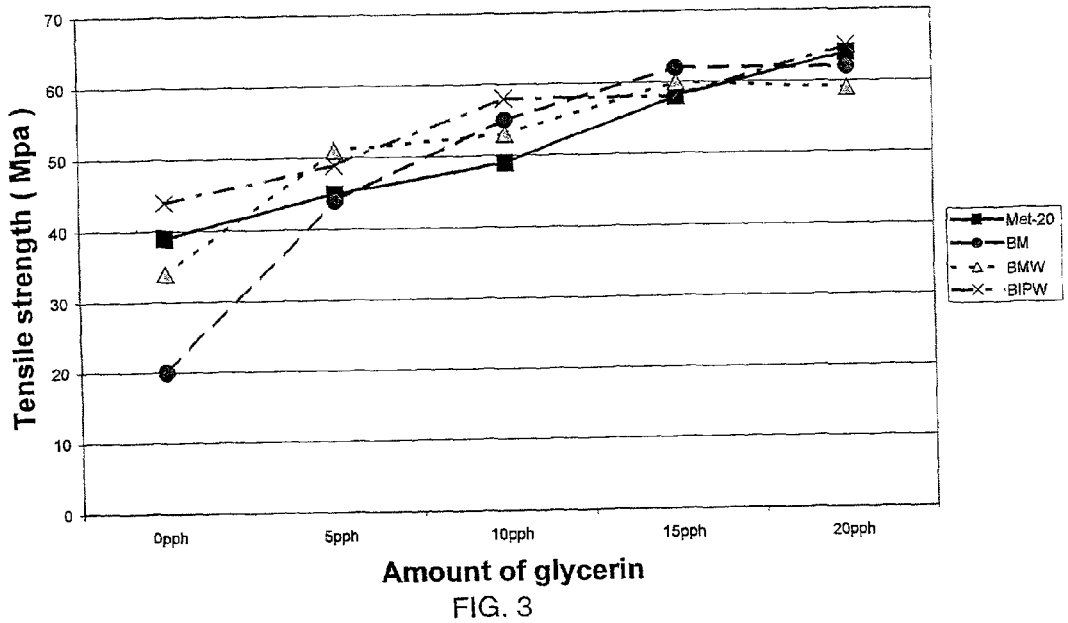
FIG. 3 is a plot of tensile strength in Mpa for the cast polyurethane resins prepared from the four soy-polyols in Examples 1-5.
Figure 4:
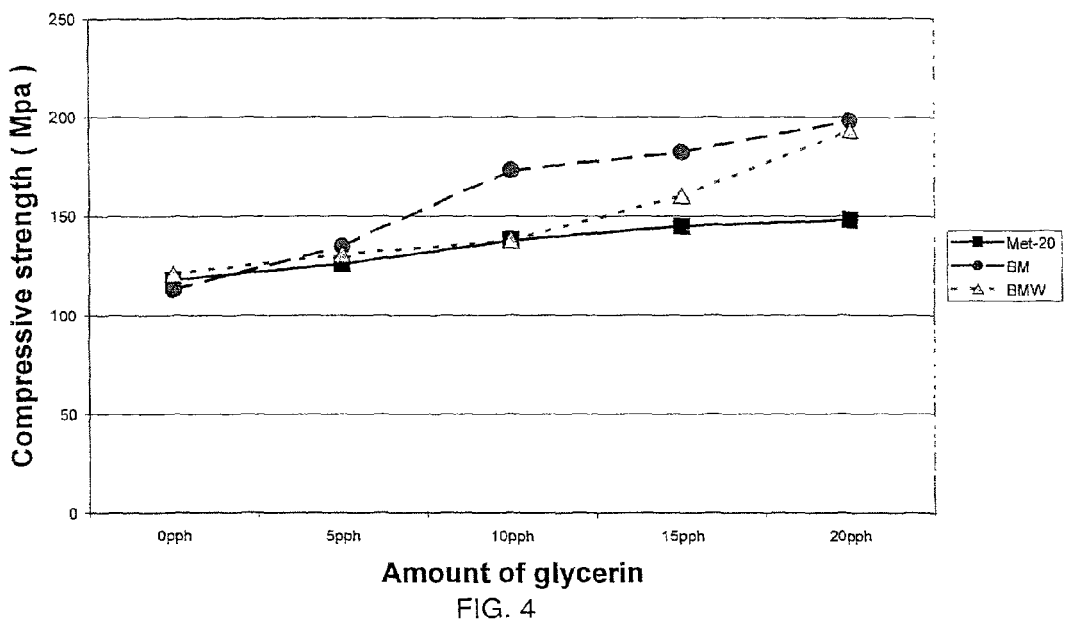
FIG. 4 is a plot of compressive strength in Mpa for the cast polyurethane resins prepared from the four soy-polyols in Examples 1-5.
Figure 5:
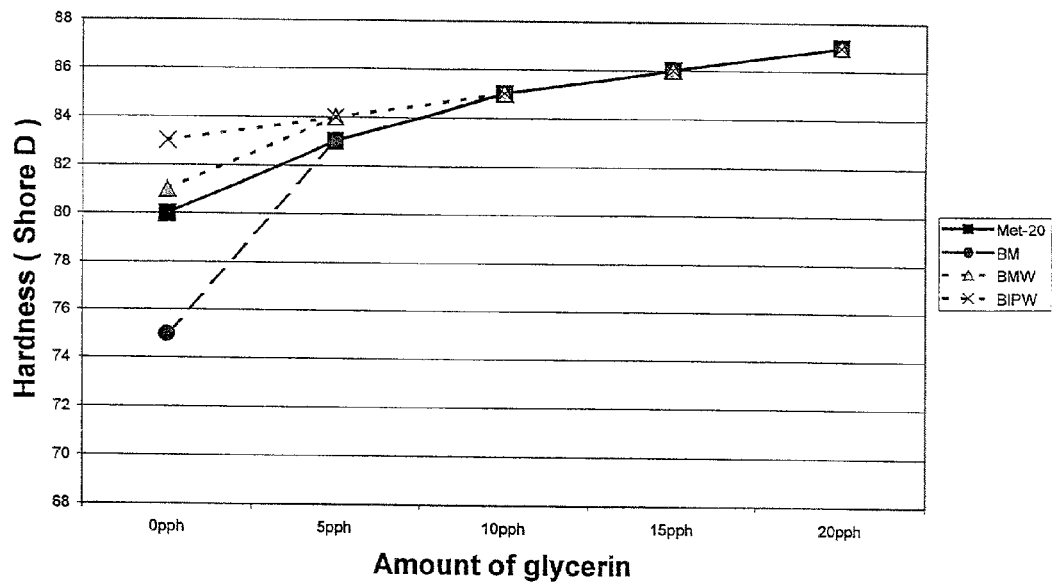
FIG. 5 is a plot of Shore D hardness for the cast polyurethane resins prepared from the four soy-polyols in Examples 1-5.

FIGS. 1-5 provide a graphical comparative representation of the results shown in Examples 2-5. FIG. 1 depicts glass transition temperature (Tg) as a function of glycerine content for cast resins of the respective polyols. FIG. 2 depicts flexural modulus as a function of glycerine content. FIG. 3 depicts tensile strength as a function of glycerine content. FIG. 4 depicts compressive strength as a function of glycerine content. FIG. 5 depicts Shore D hardness as a function of glycerine content.

The BIPW-based cast samples resulted in the highest Tg and mechanical strength apparently due to its high OH# (initially 256 mgKOH/g without glycerine). The cast polyurethane sample formed from the BM polyol appears to have the lowest Tg and mechanical strengths which is likely resultant from its lower OH# (initially 180 mgKOH/g). The BMW-based and Met-20 based cast polyurethane samples had moderate Tg and mechanical properties as compared to the samples formed from the BM and BIPW resins. The properties of BMW and Met-20 samples appear to be similar because these two polyols have similar and moderate OH#'s (OH# of BMW =207 mgKOH/g versus OH# of Met-20=208 mgKOH/g).

The properties of the cast samples prepared using 5 pph glycerin, with each of the four different polyols, were analyzed. It was observed that the BIPW-based cast polyurethane sample displayed the highest Tg and mechanical properties. Conversely, it was observed that the lowest Tg and mechanical properties were obtained with the BM-based cast sample. The properties of BMW-based and Met-20-based polyurethane samples were intermediate between the BM and BIPW samples. However, by increasing the glycerin concentration, the differences in properties between the cast samples of the four different polyols decreased. As such, better properties of cast polyurethane samples were obtained by adjusting the total OH# with proper concentration of glycerin. The addition of glycerin to lower OH# polyol-based cast polyurethane samples yielded similar properties as high OH# polyol-based resins. Despite having relatively higher mechanical properties, the polyol resin BIPW was not selected as the preferred soy-polyol for producing a polyurethane concrete because its high viscosity (26 Pa·s) made it more difficult to mix. The amount of glycerin is preferably limited to a relatively low level because it is comparatively costly. Thus, the polyol resin BM (OH#=180 mgKOH/g) was determined to be commercially less suitable for use. BMW and Met-20 polyols in comparison displayed substantially the same properties in the resultant cast resin samples. Therefore, the soy-polyol BMW was selected as the preferred soy-polyol for use in preparing samples of PU-based polymer concrete.

EXAMPLE 6

BMW Resin Gel Time Sensitivity Study

Figure 6:
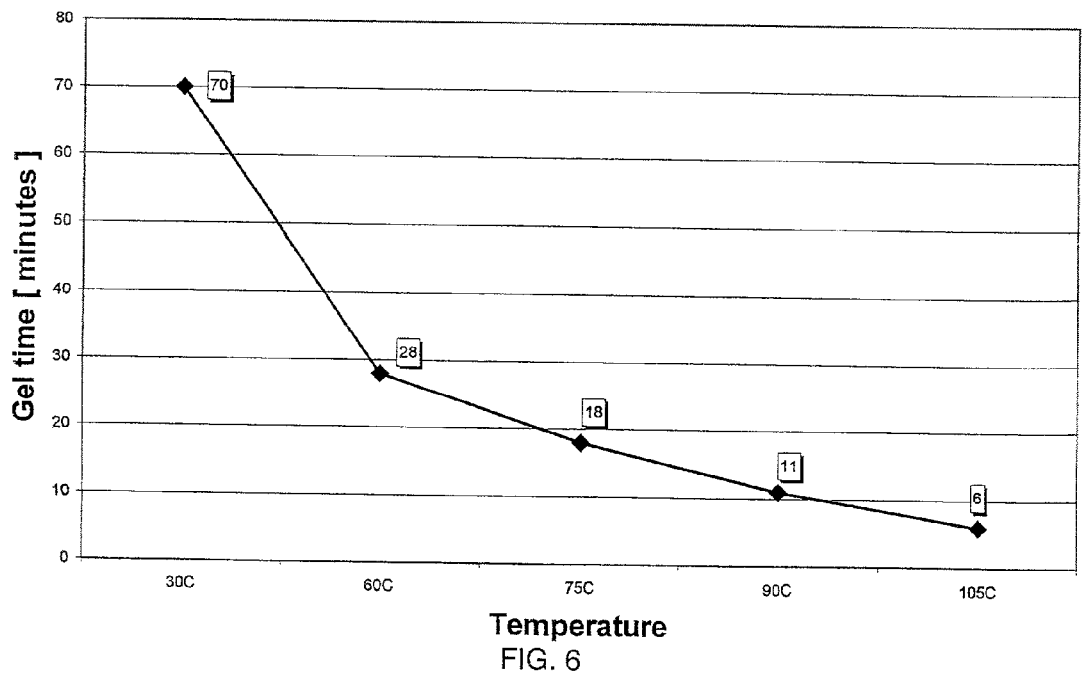
FIG. 6 is a plot of temperature versus gel time for a soy-based polyol polyurethane resin.

Gel time is defined as the time in which 200 Pa·s of viscosity in a resin is reached as the resin is curing. The time for gelling is important an important consideration when forming composite materials, e.g. concretes. Aliquots of the BMW soy polyol without glycerine were mixed with an equivalent isocyanate moiety from PAPI® 2901 and hardened in an identical manner with respect to the cast resins of Example 2. Five samples were obtained and cured in heated containers that were maintained at different temperatures including 30, 60, 75, 90 and 105° C. Viscosity measurements were obtained every minute, and the results are shown in FIG. 6. The gel times ranged from 6 minutes at 105° C. to 70 minutes at 30° C.

Figure 7:
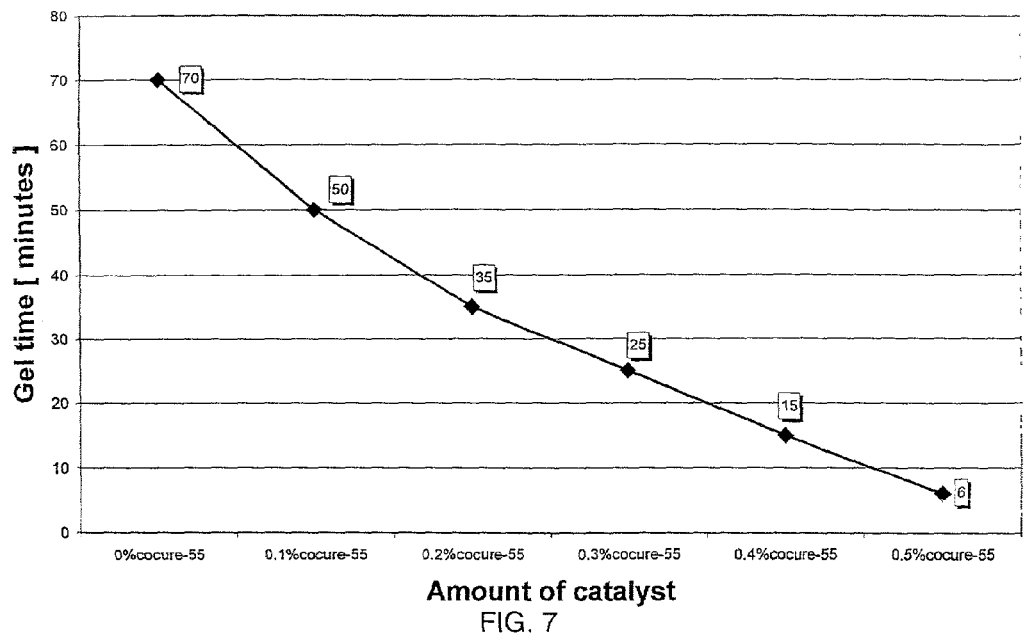
FIG. 7 is a plot of catalyst content versus gel time for a soy-based polyol polyurethane resin.

Aliquots of the BMW soy polyol without glycerine were mixed with an equivalent isocyanate moiety from PAPI® 2901 and hardened in an identical manner with respect to the cast resins of Example 2, except a catalyst, Cocure-55 obtained from Cas Chem, Inc., was added in differing concentrations to the uncured resin mixture. The amount of catalyst varied among the respective samples as 0%, 0.1%, 0.2%, 0.3%, 0.4%, and 0.5% by weight of the resin. Viscosity measurements were obtained every minute, and the results are shown in FIG. 7. The gel times ranged from 6 minutes at 0.5% to 70 minutes at 0%.

As can be seen, the gel time decreases as either the temperature or amount of catalyst increases. Furthermore, the gel time effects of temperature variation can be selectively reproduced or compensated using a catalyst, which is more easily controllable in the intended environment of use.

The resin properties having been demonstrated by the forgoing Examples, additional Examples follow to demonstrate the properties of the resins in combination with an aggregate composition.

EXAMPLE 7

Effect of NCO/OH Ratio on Mechanical Properties of Concrete

A series of four BMW soy polyol concrete samples were prepared according to the procedure of Example 2 with varied NCO/OH ratios in order to determine the effect of NCO/OH ratio on the mechanical properties. The NCO/OH ratio varied as 1.02, 1.05, 1.10 and 1.15 with the NCO moiety being supplied through PAPI® 2901. Supplemental NCO material is advisable in polymer concretes is desirable, in order to react with free hydroxyl groups that reside on the surface of the aggregates. The resin was mixed thoroughly with aggregate in a weight of resin comprising fifteen percent of the total concrete mixture including the aggregate. The aggregate mixture comprised 15% fine fly ash powder obtained from Ash Grove Cement Company (MPA Standard 9-SOT), 50% pea gravel (3/32 inch size obtained from Joplin Stone Co.), 17.5% coarse silica sand (0.5 mm particle size obtained from Unimin Corporation), and 17.5% fine silica sand (0.25 mm particle size obtained from Unimin Corporation). The samples were cast in molds and left to cure overnight at ambient temperature for at least about twelve hours.

Figure 8:
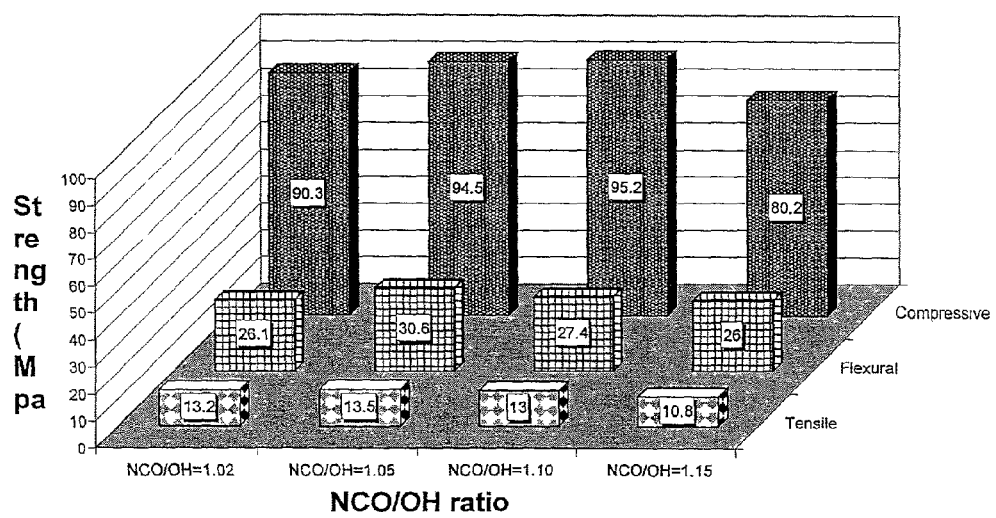
FIG. 8 is a bar graph of tensile, flexural, and compressive strength measurements in Mpa performed on a variety of soy-polyol polyurethane resins where the resin composition varies by the isocyano to hydroxyl ratio.

The mechanical properties of tensile, flexural and compressive strengths were determined according to the test procedures described above. The resultant properties are shown in FIG. 8, which demonstrates an optimum NCO/OH ratio at about 1.05 with respect to all properties, except compressive strength which is substantially at an optimum value. Polymer concrete samples with ratios of NCO/OH at 1.02 and 1.15 did not display significantly better mechanical properties. After comparing the properties of samples with NCO/OH ratios of 1.05 and 1.10, the NCO/OH ratio 1.05 was selected as the most preferred NCO/OH ratio for preparing the polymer concrete.

EXAMPLE 8

The Effect of Resin Amounts on Mechanical Strength

Figure 9:
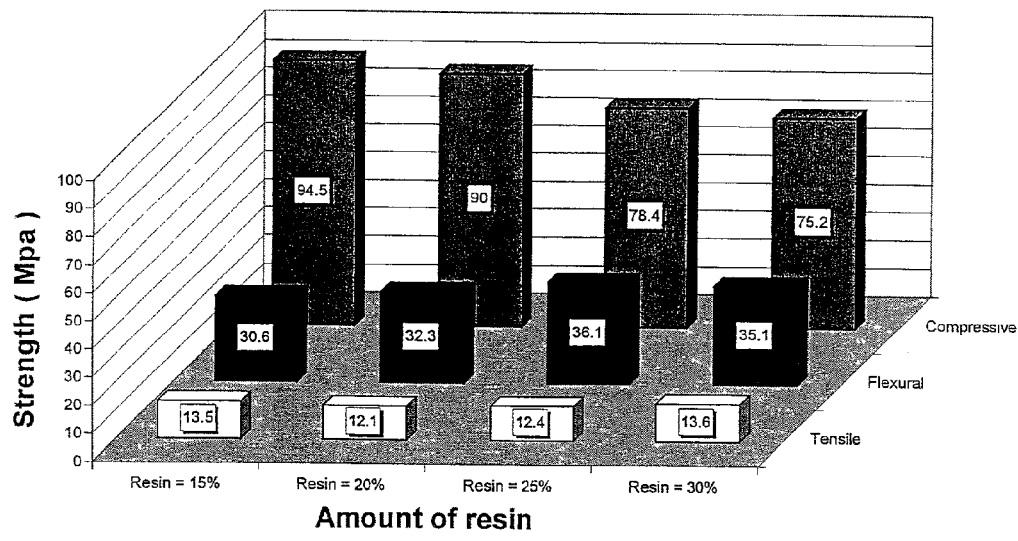
FIG. 9 is a bar graph of tensile, flexural, and compressive strength measurements in Mpa performed on a variety of soy-polyurethane concretes where the resin content of respective concrete samples varies from 15% to 30% by weight of the concrete.

In order to determine the effects of the amount of polyurethane resin binder on mechanical properties of polymer concrete, four BMW soy polyol samples were prepared according to the procedure in Example 7, except different amounts of resin binder were used at percentages including 15%, 20%, 25%, and 30% by weight of the concrete mixture. The aggregate comprised the remaining amount of concrete. The mechanical properties of the resultant polymer concrete samples were determined according to the test procedures described above, as to compressive strength, splitting tensile strength, flexural strength. The resultant properties are shown in FIG. 9.

The polymer concrete sample with 15% resin had the highest compressive strength and splitting tensile strength, however, the flexural strength was slightly lower than the other samples. Although the sample made with 30% resin exhibited good splitting tensile strength and flexural strength, the compressive strength was observed to be too low. The samples made with 20% resin exhibited acceptable mechanical properties. although they are not the highest measured.

These results show that the most preferred percentage of resin binder in the polymer concrete is between about 15% and about 20% for structural performance of the concrete. The aggregates tended to settle in samples having more than about 30% by weight of resin and the compressive strength was too low. Consequently, this is the maximum amount of resin in the preferred range of use. Cost advantages and improved structural properties may be obtained by using lesser amounts of resin, but it becomes difficult to coat all of the aggregate with resin when using resin amounts less than 15% by total weight of the mixture. The resin may be foamed, e.g., by the addition of small amounts of water, to enhance the coating effect and structural integrity of the polymer concrete in low resin content concretes.

EXAMPLE 9

Aggregate Variation Affecting Concrete Strength Fine Powder

Figure 10:
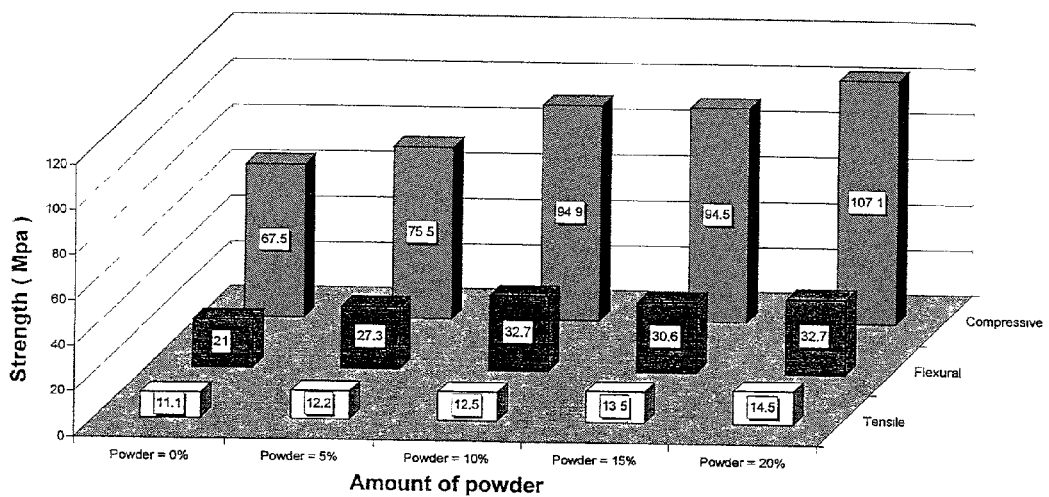
FIG. 10 is a bar graph of tensile, flexural, and compressive strength measurements in Mpa performed on a variety of soy-polyurethane concretes where the aggregate composition in the concrete samples varies in the amount of fine powder added from 0% to 30% by weight of the aggregate.

Five polymer concrete samples were prepared according to the procedure in Example 7, except that the amount of fine fly ash powder in the aggregate was varied. The use of fine powder improves the space filing within the concrete and, thus, increases the interaction between the resin binder and the aggregates. An initial aggregate composition was prepared including 50% pea gravel by weight with the remaining 50% being coarse sand and fine sand in equal amounts. This aggregate composition served as the base aggregate representing a 0% by weight of fine fly ash powder. Additional aggregate compositions were prepared by adding fine powder in amounts of 5%, 10%, 15%, and 20% by weight of the aggregate compositions. The increasing amounts of fine powder were compensated in the additional aggregate compositions by reducing the coarse sand and fine sand components in equal amounts. Thus, for example, the additional aggregate composition comprising 20% by weight of fine powder 20% contained 50% pea gravel, 15% coarse sand, and 15% fine sand. The resin amount was 15% based on the total weight of polymer concrete. The mechanical properties were determined according to the test procedures described above, as to compressive strength, splitting tensile strength, flexural strength. FIG. 10 shows the resultant mechanical properties.

The samples made with 20% fine powder resulted in the highest mechanical strength values. The samples made with 10% and 15% fine powder displayed excellent mechanical strength, however, their strength was slightly lower than the mechanical strength of the sample made with 20% fine powder. Considering the relatively high viscosity of the resin binder, it is difficult to prepare polymer concrete with 20% fine powder in commercial quantities without specialized equipment. Therefore, the commercially preferred amount of fine powder in the polyurethane polymer concrete is preferably from 10% to 15% by weight of the aggregate and is most preferably about 15%.

EXAMPLE 10

Aggregate Variation Affecting Concrete Strength Pea Gravel

Pea gravel is one of the more common constituents of commercial aggregates, and it is often the least costly component of the aggregate. This cost advantage is offset by a corresponding reduction in mechanical strength because aggregates of smaller size usually result in better mechanical strength owing to a better distribution of aggregates in the structural matrix and a better interaction with the resin binder.

Figure 11:
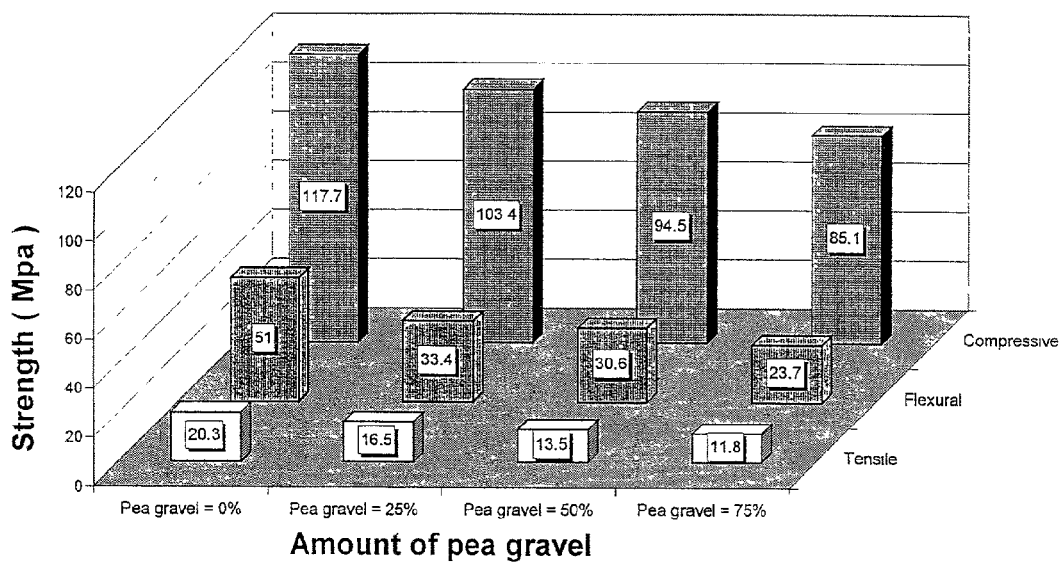
FIG. 11 is a bar graph of tensile, flexural, and compressive strength measurements in Mpa performed on a variety of soy-polyurethane concretes where the aggregate composition in the concrete samples varies in the amount of pea gravel added from 0% to 75% by weight of the aggregate.

Four polymer concrete samples were prepared according to the procedure in Example 7, except that the amount of pea gravel was varied in order to determine the related effects on mechanical properties. The resin binder amount used was 15% of the total weight of the mixture. A base aggregate composition was prepared using 15% fine fly ash powder, 42.5% coarse sand, 42.5% fine sand, and 0% pea gravel by weight of the aggregate. Additional aggregates were prepared by adding pea gravel to obtain additional aggregates having 25%, 50% and 75% by weight of pea gravel. The additional pea gravel was compensated by reducing equally the amount of coarse sand and fine sand. Thus, for example, the aggregate comprising 75% pea gravel contained 15% fine powder, 5% fine sand and 5% coarse sand. The mechanical properties of the polymer concrete samples with different amounts of pea gravel were determined according to the test procedures described above, as to compressive strength, splitting tensile strength, flexural strength. FIG. 11 presents the results.

Among the four polymer concrete samples, the sample without pea gravel yielded the highest mechanical strengths. As the amount of pea gravel increased, the mechanical strength of the resultant samples decreased. The polymer concrete sample with 75% pea gravel had the lowest mechanical strength.

EXAMPLE 11

Aggregate Variation Affecting Concrete Strength Sand Type

Figure 12:
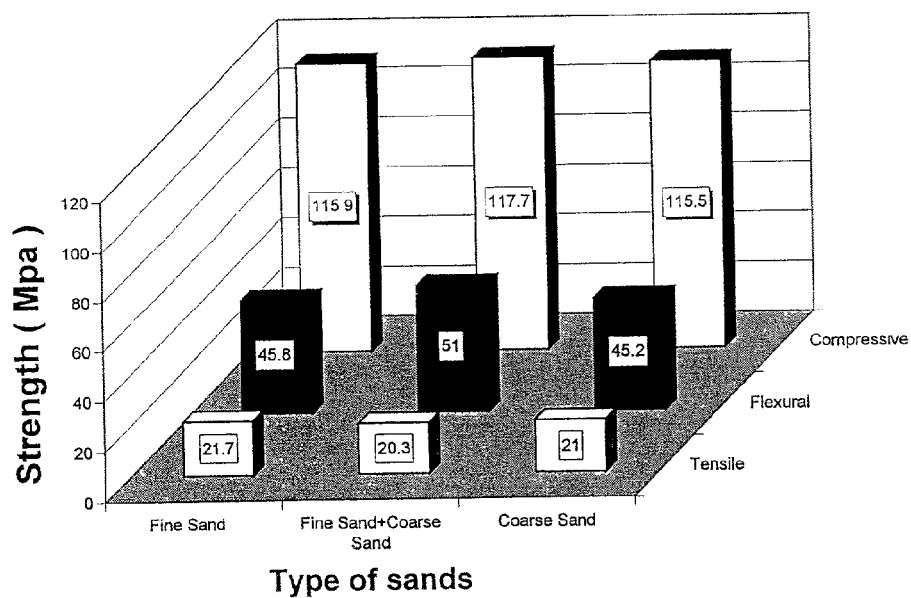
FIG. 12 is a bar graph of tensile, flexural, and compressive strength measurements in Mpa performed on a variety of soy-polyurethane concretes where the aggregate composition in the concrete samples varies in the type of sand added.

In order to determine the effects on mechanical strength between coarse sand and fine sand, three polymer concrete samples were prepared according to the procedure in Example 7, but varying the aggregate composition according to sand type. The resin binder content was 15% of the concrete mixture. The respective aggregate compositions consisted of: (1) 15% fine powder and 85% fine sand, (2) 15% fine powder and 85% mixed coarse and fine sand (50/50 mix), and (3) 15% fine powder and 85% coarse sand. The mechanical properties of the polymer concrete samples were determined according to the test procedures described above, as to compressive strength, splitting tensile strength, flexural strength. FIG. 12 presents the results.

The three polymer concrete samples had almost the same mechanical strength. It is apparent from the results above that the sand type does not significantly affect the mechanical strength of polyurethane polymer concrete.

EXAMPLE 12

Figure 13:
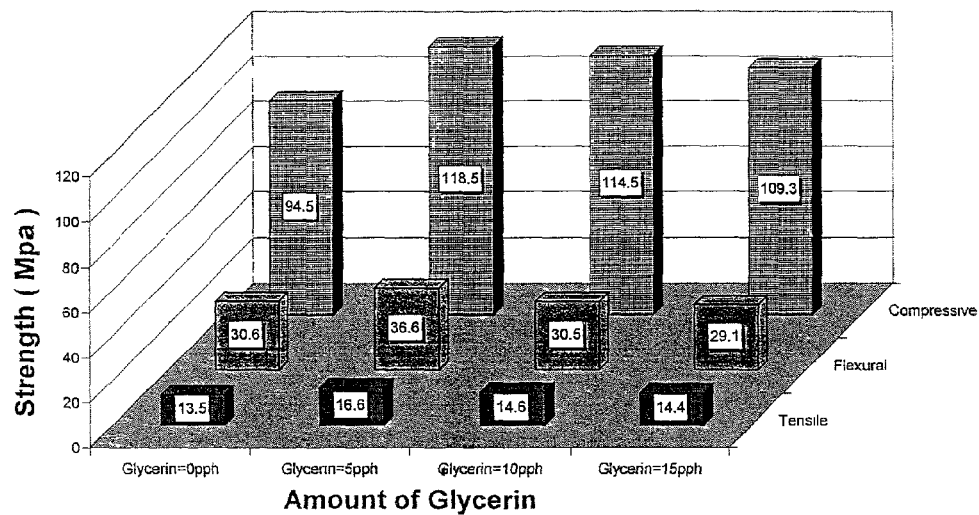
FIG. 13 is a bar graph of tensile, flexural, and compressive strength measurements in Mpa performed on a variety of soy-polyurethane concretes with pea gravel where the resin composition in the concrete samples varies in the amount of glycerine crosslinker added from 0 parts per hundred to 15 parts per hundred by weight of the resin in a cement where the aggregate did include pea gravel.

Glycerine Content Variations on Mechanical Properties of Concrete with Pea Gravel In order to determine the effect of glycerin on mechanical properties of polyurethane polymer concrete, two sets of polymer concrete samples were prepared according to the procedure in Example 7, except that the concentration of glycerin was varied. Four polymer concrete samples were prepared with varied concentrations of glycerin at 0, 5, 10, and 15 pph by weigh of the resin. The content of resin binder in the concrete mixture was 15%. Aggregates consisted of 15% fine powder, 17.5% coarse sand, 17.5% fine sand, and 50% pea gravel. The mechanical properties of the polymer concrete samples were determined according to the test procedures described above, as to compressive strength, splitting tensile strength, flexural strength. FIG. 13 presents the results.

The polymer concrete samples with added glycerin had higher mechanical strengths than the sample without glycerin. However, the highest mechanical strength was not obtained from the sample that had the highest concentration of glycerin. The polymer concrete sample with 5 pph glycerin had the highest mechanical strength. The mechanical strength decreased with increasing glycerin concentrations above 5 pph.

EXAMPLE 13

Figure 14:
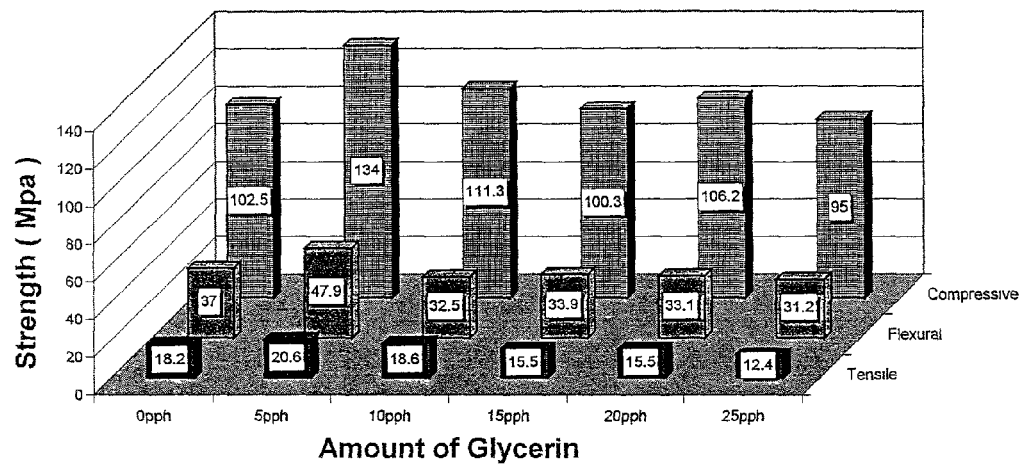
FIG. 14 is a bar graph of tensile, flexural, and compressive strength measurements in Mpa performed on a variety of soy-polyurethane concretes with pea gravel where the resin composition in the concrete samples varies in the amount of glycerine crosslinker added from 0 parts per hundred to 25 parts per hundred by weight of the resin in a cement where the aggregate did not include pea gravel.

Glycerine Content Variations on Mechanical Properties of Concrete without Pea Gravel Six polymer concrete samples were prepared according to the procedure in Example 7, except that the concentration of glycerin) was varied to comprise 0, 5, 10, 15, 20, and 25 pph by weight of the resin. The percentage of resin binder in the concrete mixture was 17.5% by weight. The aggregates consisted of 15% fine powder, 42.5% coarse sand, and 42.5% fine sand. The mechanical properties of the polymer concrete samples with different amounts of pea gravel were determined according to the test procedures described above, as to compressive strength, splitting tensile strength, flexural strength. FIG. 14 presents the results.

A comparison between the results presented in FIG. 14 and the results of FIG. 13 shows that similar results are obtained. In each case, the sample with 5 pph glycerin had the highest mechanical strengths, and the mechanical strength of samples with more than 5 pph glycerin decreased with increasing glycerin concentration. The samples with more than 15 pph glycerin were weaker than the sample without glycerin. As such, the sample with the highest concentration of glycerin (25 pph) displayed the lowest mechanical strength in FIG. 14

With more than 5 pph glycerin in the polymer concrete, glycerin did not display the same effect as in cast polyurethane resin samples. While not wishing to be bound by theory, a possible explanation is that the polyurethane polymer concrete sample with high concentration of glycerin does not have a well-distributed interaction in polyurethane polymer concrete because of the change of viscosity. As such, higher concentrations of glycerin require a higher percentage of isocyanate in the resin binder which may induce separation of binder from the filler.

EXAMPLE 14

Curing of Concrete by Calatyst Versus Temperature

Figure 15:
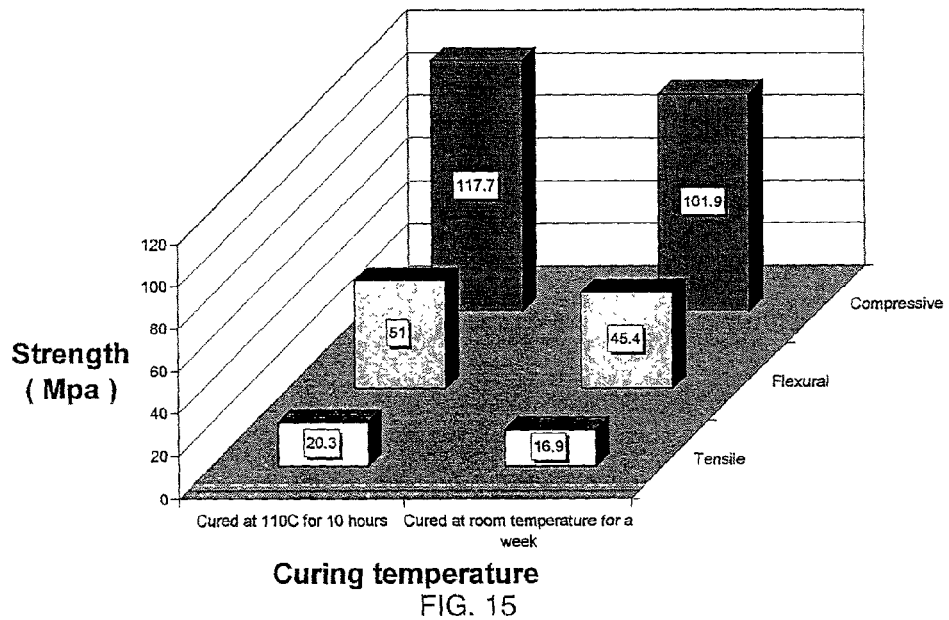
FIG. 15 is a bar graph of tensile, flexural, and compressive strength measurements in Mpa performed on a variety of soy-polyurethane concretes that were cured at different times and temperatures.

In order to determine the effect of curing technique on mechanical strength of polymer concrete, two samples were prepared according to the procedure in Example 7, except that different curing temperatures were used. These two samples were based on the same formulation consisting of 15% resin binder by weight of the concrete. The aggregate consisted of 15% fine powder and 85% sand in a 50/50 mixture of coarse and fine sand. Cocure-55 at 0.4% by weight of the resin was the catalyst used in a sample cured at room temperature (averaging 18° C.) for one week. The other sample was cured at 110° C. for ten hours. The mechanical properties of the polymer concrete samples were determined according to the test procedures described above, as to compressive strength, splitting tensile strength, flexural strength. FIG. 15 presents the results.

After one week curing, the sample cured at room temperature had lower mechanical strengths than the sample cured at 110° C. for 10 hours. More specifically, for splitting tensile strength was 16.7% lower, flexural strength was 10.8% lower, and compressive strength was 13.4% lower. While curing at room temperature is effective, a longer cure time is required to achieve mechanical strength comparable to the higher temperature cure.

EXAMPLE 15

Effects of Catalyst Concentration on Gel Time, Pot Life, and Curing Time

Figure 16:
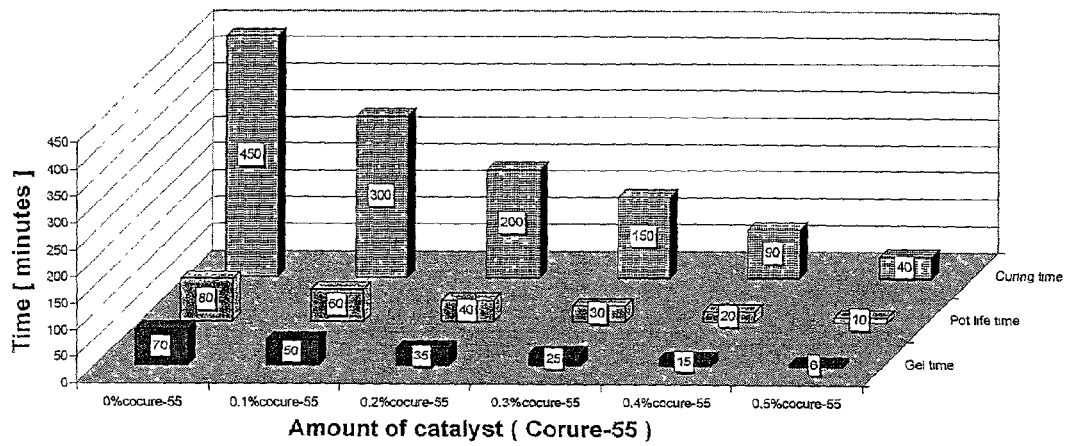
FIG. 16 is a bar graph gel time, pot life, and curing time measurements performed on a variety of soy-polyurethane concretes that contained different amounts of catalyst ranging from 0% to 0.5%.

For room temperature curing polymer concrete, a catalyst advantageously reduces the curing time. The selection of a catalyst and catalyst concentration is based on its effects on the gel time, pot life time, and curing time. Generally, the catalyst selected should have a long pot life time and short curing time. The catalyst used in the present example was Cocure-55. The effects of different catalyst concentration at 0.1%, 0.2%, 0.3%, 0.4%, and 0.5% by weight of the resin on gel time, pot life time, and curing time were studied at room temperature. FIG. 16 presents the results.

The pot life of the sample with 0.5% catalyst was too short to finish the mixing with aggregates. A sample with 0.4% catalyst had a pot life of 20 minutes, and the sample set up in 90 minutes. For preparing polymer concrete in a small quantity, an acceptable catalyst concentration is up to 0.4%. Concentrations of 0.1%, 0.2%, and 0.3% of Cocure-55, or even no catalyst, can be used to prepare the polymer concrete. The catalyst concentration can be varied from 0% to 0.4% according to the application and requirement of the polymer concrete.

EXAMPLE 16

Effects of Catalyst Concentration on Mechanical Strength 24 Hour Cure Results

Figure 17:
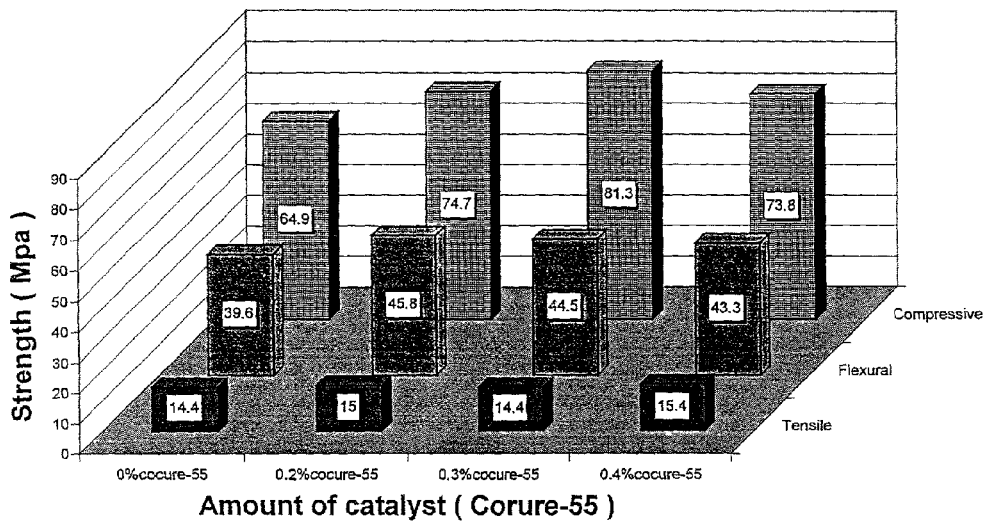
FIG. 17 is a bar graph of tensile, flexural, and compressive strength measurements in Mpa performed on a variety of soy-polyurethane concretes that contained different amounts of catalyst ranging from 0% to 0.4% that were cured for 24 hours.

Four polyurethane polymer concrete samples were prepared according to the procedure in Example 7, except the amount of was Cocure-55 catalyst varied in concentrations of 0%, 0.2%, 0.3%, and 0.4% by weight of the resin and the percentage of the resin was 17.5% of the concrete mixture. Aggregates consisted of 15% fine powder and 85% sand in a 50/50 mixture of coarse and fine sand. All samples were cured at room temperature. The mechanical strengths were determined according to the test procedures described above after 24 hours curing, as to compressive strength, splitting tensile strength, flexural strength. FIG. 17 presents the results.

Increasing amounts of catalyst resulted in samples having better structural properties after 24 hours.

EXAMPLE 17

Figure 18:
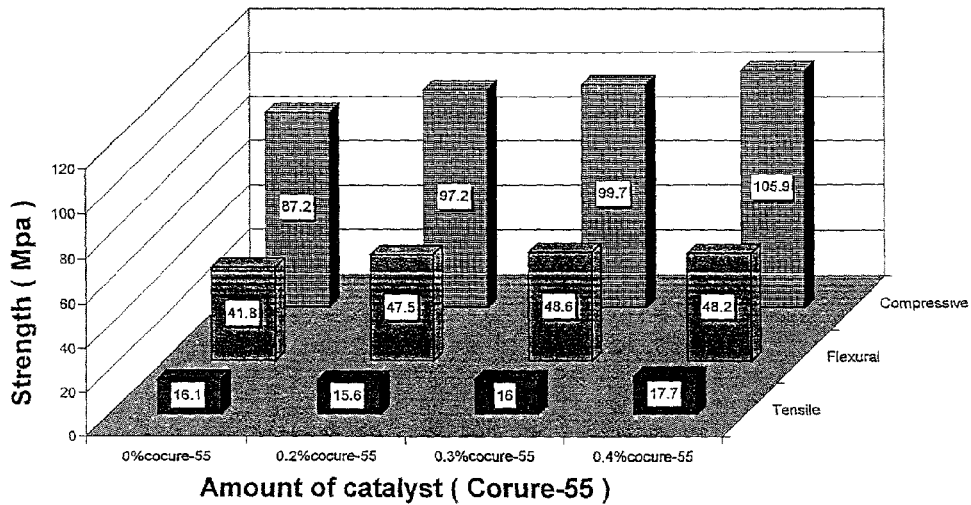
FIG. 18 is a bar graph of tensile, flexural, and compressive strength measurements in Mpa performed on a variety of soy-polyurethane concretes that contained different amounts of catalyst ranging from 0% to 0.4% that were cured for one week.

Effects of Catalyst Concentration on Mechanical Strength One Week Cure Results The procedure of Example 16 was repeated, except the samples were permitted to cure at room temperature for one week. The mechanical strengths were determined according to the test procedures described above, as to compressive strength, splitting tensile strength, flexural strength. FIG. 18 presents the results.

After one week at room temperature curing, the effects of catalyst concentration on mechanical strengths became substantially equal to one another. The higher catalyst concentration demonstrated slightly better mechanical strength. The sample without the catalyst displayed relatively lower mechanical strength.

The use of catalyst is preferred for curing at room temperature due to timing constraints, but the mechanical properties of mixtures prepared using catalysts versus those pro[pared without catalysts tend to equilibrate with time.

EXAMPLE 18

Effects of Catalyst Concentration on Mechanical Strength Two Week, One Month, to Month, and Three Month Cure Results The procedure of Example 17 was repeated, except the samples were permitted to cure at room temperature for longer periods of time, and tests were only performed on the samples using 0% catalyst and 0.3% by weight of the Cocure-55 catalyst. The longer times included two weeks, one month, two months, and three months. The mechanical strengths were determined according to the test procedures described above, as to compressive strength, splitting tensile strength, flexural strength.

Figure 19:
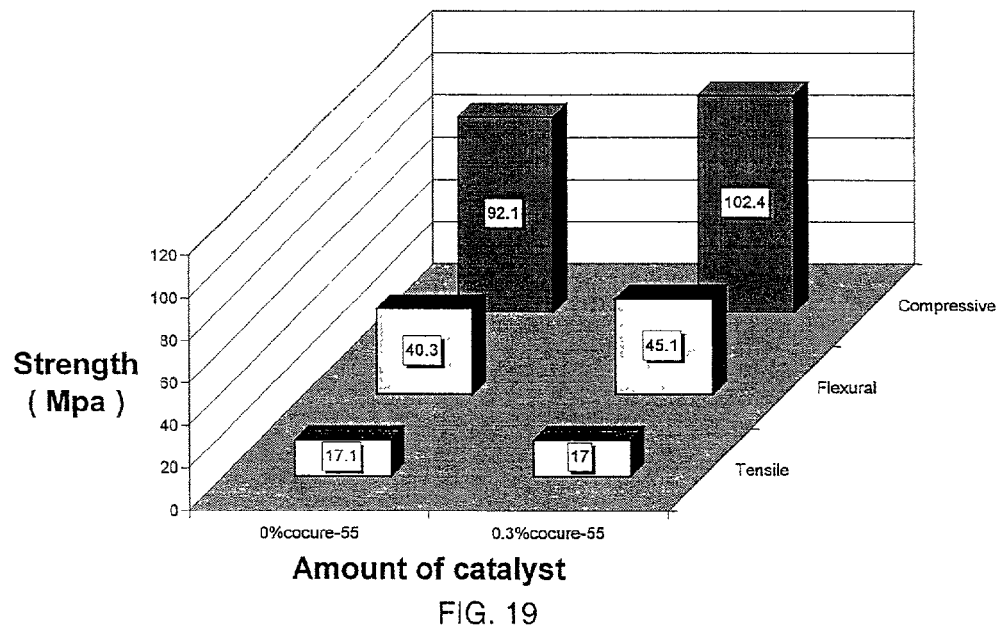
FIG. 19 is a bar graph of tensile, flexural, and compressive strength measurements in Mpa performed on a variety of soy-polyurethane concretes that contained different amounts of catalyst ranging from 0% to 0.3% that were cured for two weeks.

FIG. 19 presents the two week cure results. After two weeks at room temperature curing, the strength of the sample with no catalyst still lagged slightly behind that of the catalyzed sample.

Figure 20:
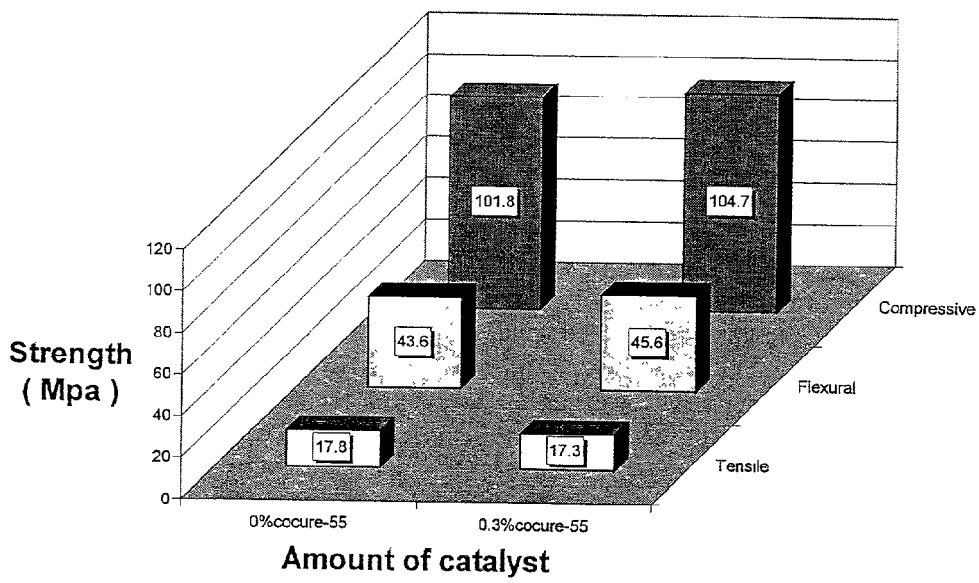
FIG. 20 is a bar graph of tensile, flexural, and compressive strength measurements in Mpa performed on a variety of soy-polyurethane concretes that contained different amounts of catalyst ranging from 0% to 0.3% that were cured for one month.
Figure 21:
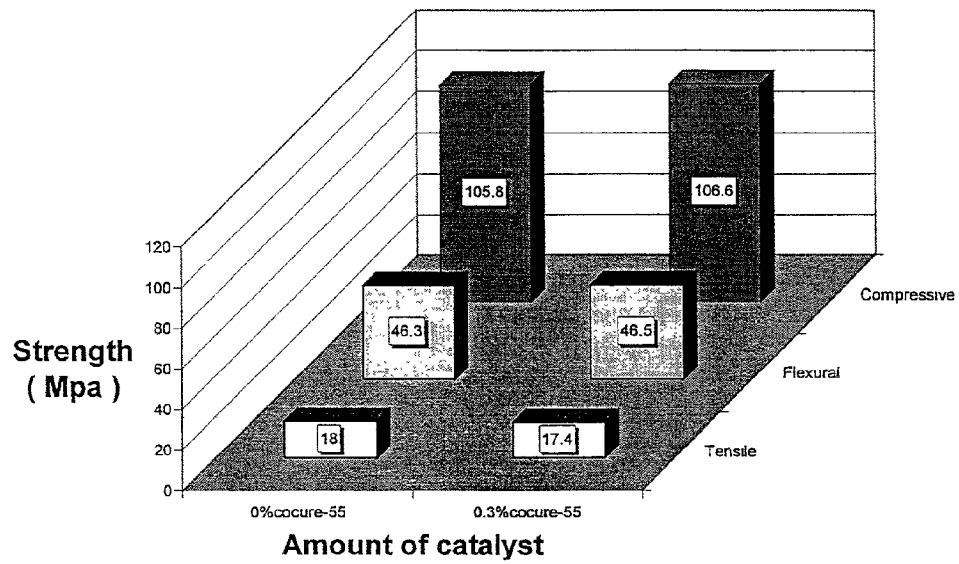
FIG. 21 is a bar graph of tensile, flexural, and compressive strength measurements in Mpa performed on a variety of soy-polyurethane concretes that contained different amounts of catalyst ranging from 0% to 0.3% that were cured for two months.
Figure 22:
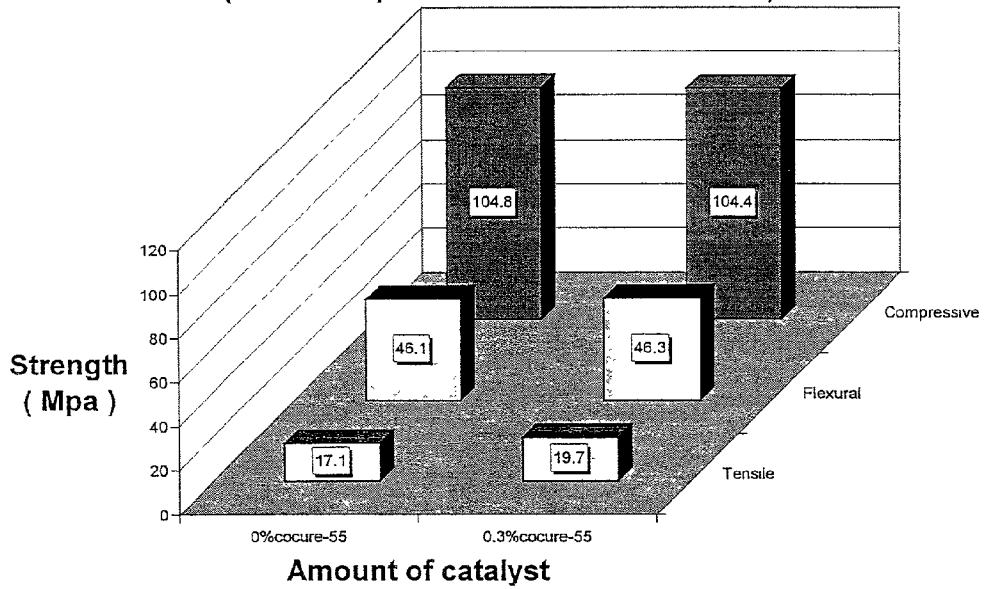
FIG. 22 is a bar graph of tensile, flexural, and compressive strength measurements in Mpa performed on a variety of soy-polyurethane concretes that contained different amounts of catalyst ranging from 0% to 0.3% that were cured for three months.

FIG. 20 presents the one month cure results, FIG. 21 presents the two month cure results, and FIG. 22 presents the three month cure results. After one month or more of curing, there is little or no appreciable difference between the mechanical strength of the sample without catalyst and the sample with 0.3% catalyst. The effect of the catalyst on mechanical strength only for about one month curing time. After one month curing, the catalyst did not appear to effect the mechanical strength of polyurethane concrete.

EXAMPLE 19

Curing Time and Strength with Different Polymeer Concrete Mixtures

Two series of concrete samples were prepared according to the procedure in Example 18, except the amount f resin and the aggregate composition were changed A first series included 0% catalyst, and a second series included 0.3% of the Cocure-55 catalyst. The mechanical strengths of these two series of samples were determined at different curing times according to the test procedures described above, and then the effect of curing time on mechanical strength and difference of effect between these two series of samples was studied.

Concrete mixtures were prepared for both series including 82.5 parts by weight of aggregates consisting of 15% fine powder, 85% sand in a 50/50 mix of coarse and fine sand, together with 17.5 parts by weight of resin binder. The mechanical strength of both series was tested, as to compressive strength, splitting tensile strength, flexural strength, at 24 hours curing, one week curing, two weeks curing, one month curing, two month curing, and three month curing.

Figure 23:
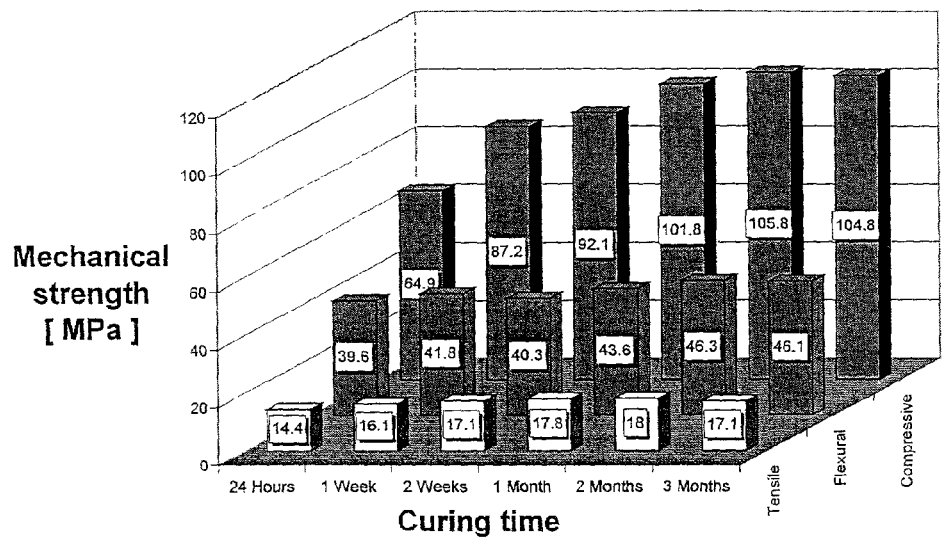
FIG. 23 is a bar graph of tensile, flexural, and compressive strength measurements in Mpa performed on a variety of soy-polyurethane concretes without catalyst that were cured at room temperature for different times ranging from 24 hours to 3 months.

FIG. 23 presents the mechanical strength test results. Tensile strength, flexural strength, and compressive strength, respectively, increased from 14.4 MPa to 17.8 MPa, 39.6 MPa to 43.6 MPa, and 64.9 MPa to 101.8 MPa when curing time increased from 24 hours to one month. Further increase of curing time did not cause a significantly further increase in mechanical strength.

Figure 24:
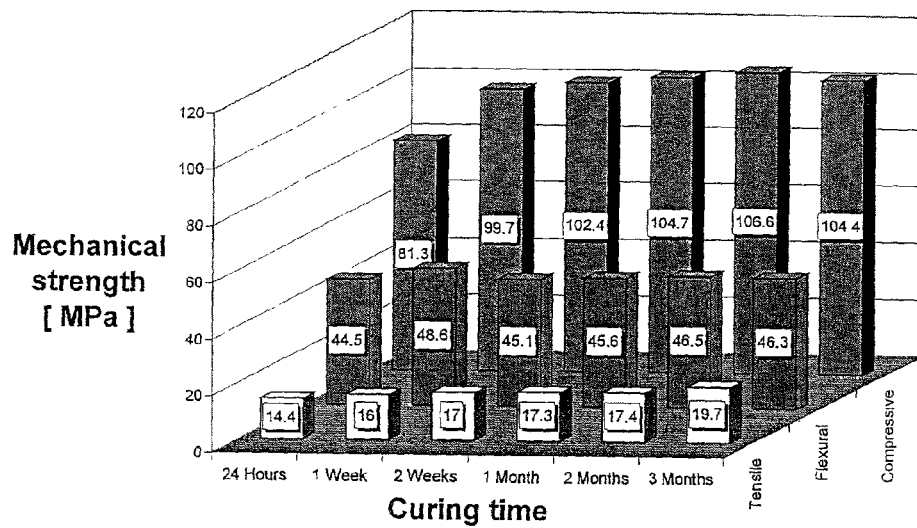
FIG. 24 is a bar graph of tensile, flexural, and compressive strength measurements in Mpa performed on a variety of soy-polyurethane concretes with 0.3% by weight of the resin that were cured at room temperature for different times ranging from 24 hours to 3 months.

The series of samples with catalyst included the same mixture as was used for the 0% catalyst series, except 0.3% by weight of the Cocure-55 catalyst was added to the resin binder. FIG. 24 presents the results. Tensile strength and compressive strength, respectively, increased from 14.4 MPa to 17 MPa and 81.3 MPa to 102.4 MPa when the curing time increased from 24 hours to two weeks. Further, increases of curing time did not cause a significant further increase in tensile or compressive strength. The flexural strength did not significantly increase with an increase of curing time. As such, the splitting tensile strength and compressive strength do not appear to be significantly affected by curing time above two weeks. Also, curing time did not significantly affect the flexural strength above 24 hours.

The soy-based polymer concrete with 0.3% catalyst cured at room temperature required two weeks to reach the highest mechanical strength which can be obtained from room temperature curing, while the soy-based polymer concrete without catalyst required one month to reach it. After one month room temperature curing, there was no difference in mechanical strength between the soy-based polymer concrete with catalyst and the concrete without catalyst.

EXAMPLE 20

Strength of Soy-Based Polyurethane Concrete Versus Other Polymer Concretes

In order to compare the mechanical properties of soy-based polyurethane polymer concrete to other polymer matrix resin based polymer concrete, four polymer concrete samples were prepared, respectively, based on different resin types. All samples were prepared in the same shape and contained the same aggregate composition consisting of 15% by weight fine powder and 85% sand in a 50/50 mixture of coarse and fine sand. The resin content of each sample was 15% by weight, and the aggregate content was 85%. The four polymer resins included BMW soy-polyol with PAPI 2901 isocyanate without glycerin, BMW soy-polyol and PAPI 2901 with 5 pph glycerin, epoxy resin (88 epoxy resin and 87 epoxy resin hardener from Fiber Glass Developments Corporation of Brookville, Ohio), and unsaturated polyester resin (Ashland Chemical 7334-T-15). After curing, the mechanical properties of these four polymer concrete samples were determined according to the test procedures described above to obtain mechanical strength measurements for including splitting tensile strength, flexural strength, flexural modules, compressive strength, glass transition temperature, and abrasion resistance.

Figure 25:
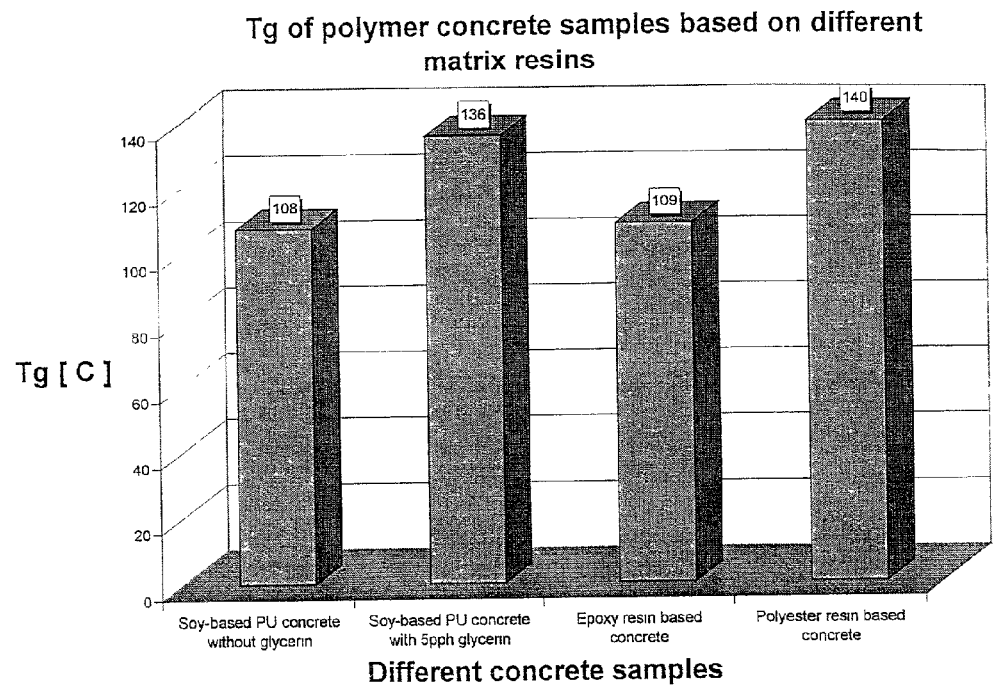
FIG. 25 is a bar graph comparing glass transition temperature, Tg in degrees Celsius, for a variety of polymer concretes.

FIG. 25 presents comparative results for the respective samples regarding glass transition temperature. These results show that soy-based polyurethane may be selectively adjusted to accommodate a wide range of glass transition temperatures, such that soy-based polyurethane without added glycerine has a glass transition temperature that is substantially equal to that of epoxy resin based polymer concrete. With 5 pph added glycerine, the soy-based polyurethane has a glass transition temperature substantially equal to that of the polyester resin concrete.

Figure 26:
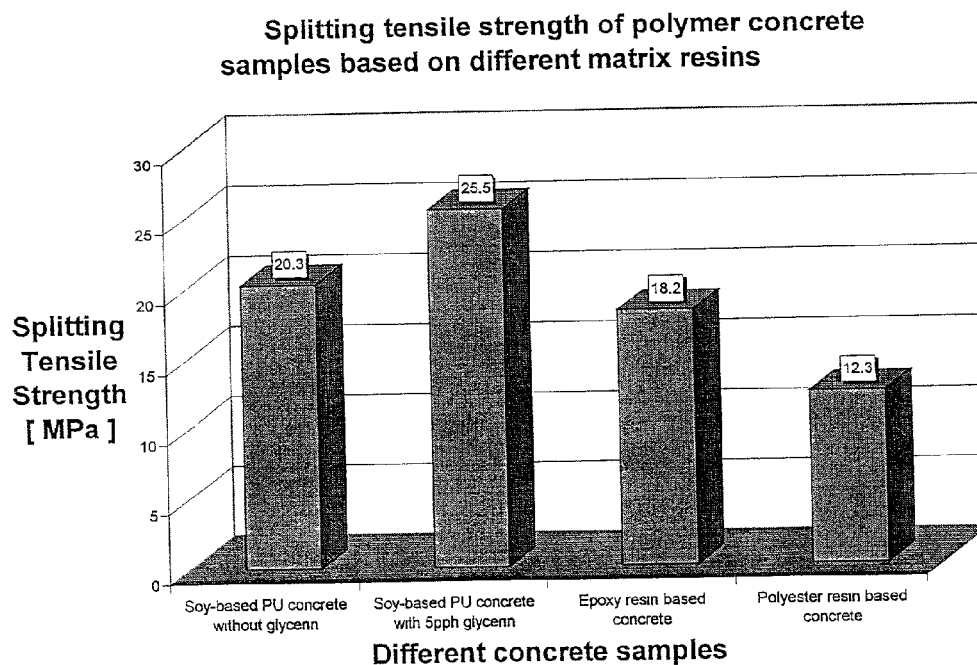
FIG. 26 is a bar graph comparing splitting tensile strength in Mpa for a variety of polymer concretes.

FIG. 26 presents comparative results for the respective samples regarding splitting tensile strength. The soy-based polyurethanes have the highest strengths, with the 5 pph glycerine sample having about forty percent more strength than the epoxy resin sample, which had the highest strength among the non-polyurethane samples.

Figure 27:
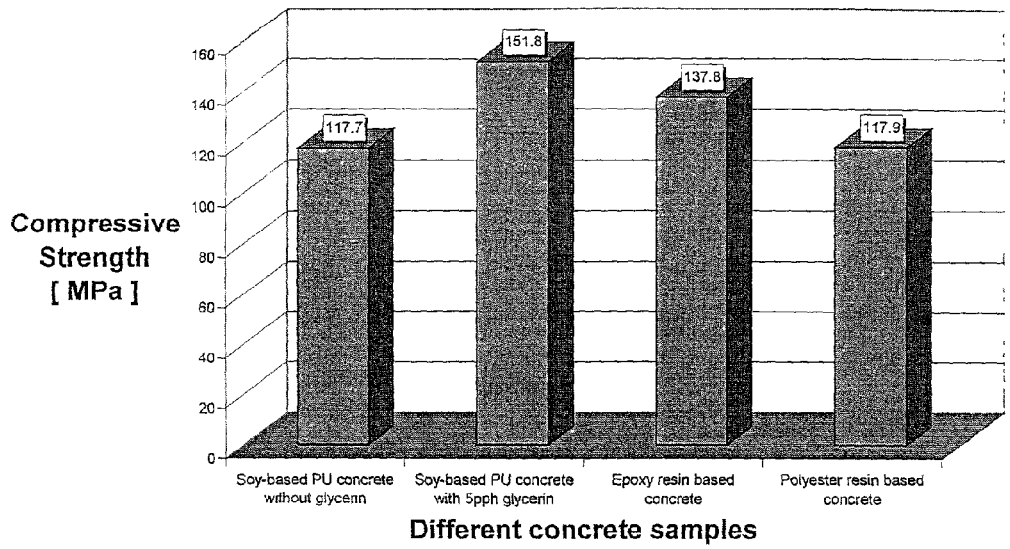
FIG. 27 is a bar graph comparing compressive strength in Mpa for a variety of polymer concretes.

FIG. 27 presents comparative results for the respective samples regarding compressive strength. The soy-based polyurethane with 5 pph glycerine had the highest compressible strength, which was about ten percent greater than the epoxy resin sample—strongest non-polyurethane concrete. Without added glycerine, the sop-polyurethane sample was as strong as the polyester resin concrete.

Figure 28:
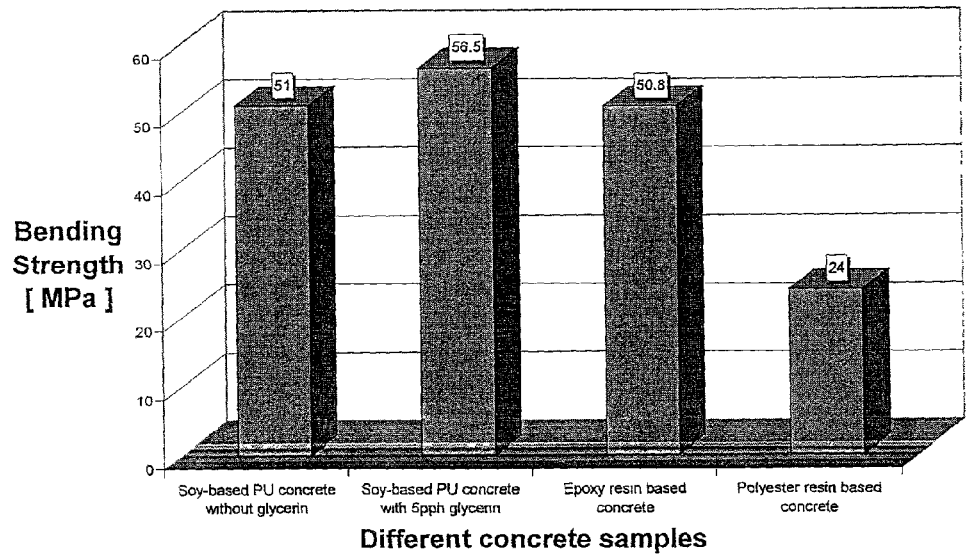
FIG. 28 is a bar graph comparing flexural or bending strength in Mpa for a variety of polymer concretes.

FIG. 28 presents the results for flexural or bending strength. Again, the polyurethane sample with 5 pph glycerine had the greatest strength, and exceeded the strength of the epoxy resin sample by eleven percent. The strength of the soy-based polyurethane sample was about equal to that of the epoxy resin sample. Both of the polyurethane samples exceeded the polyester resin sample strength by more than one-hundred percent.

Figure 29:
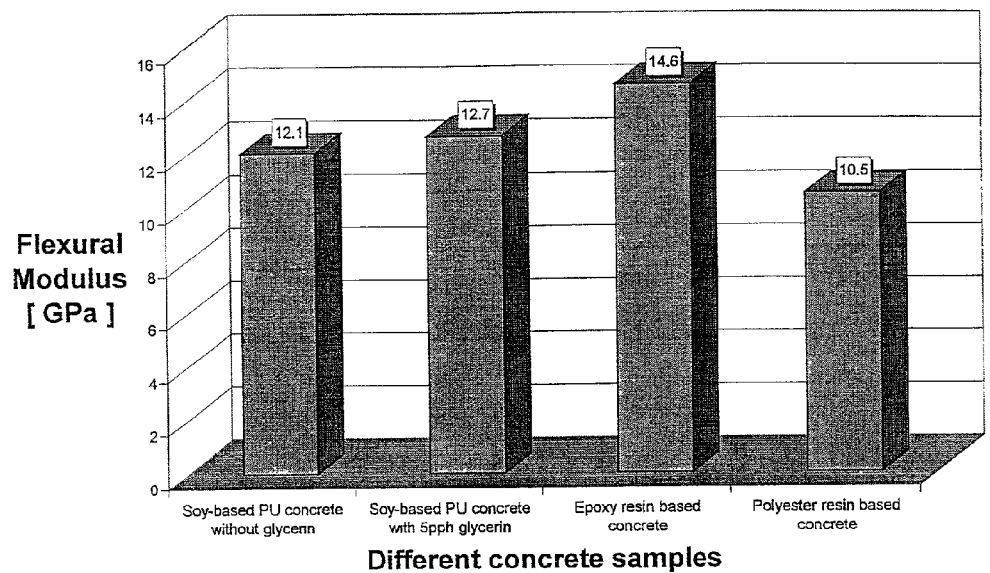
FIG. 29 is a bar graph comparing flexural modulus in Gpa for a variety of polymer concretes.

FIG. 29 presents the results for flexural modulus measurements. The soy-based polyurethane samples performed about equally, and the strongest sample was the epoxy resin sample.

Figure 30:
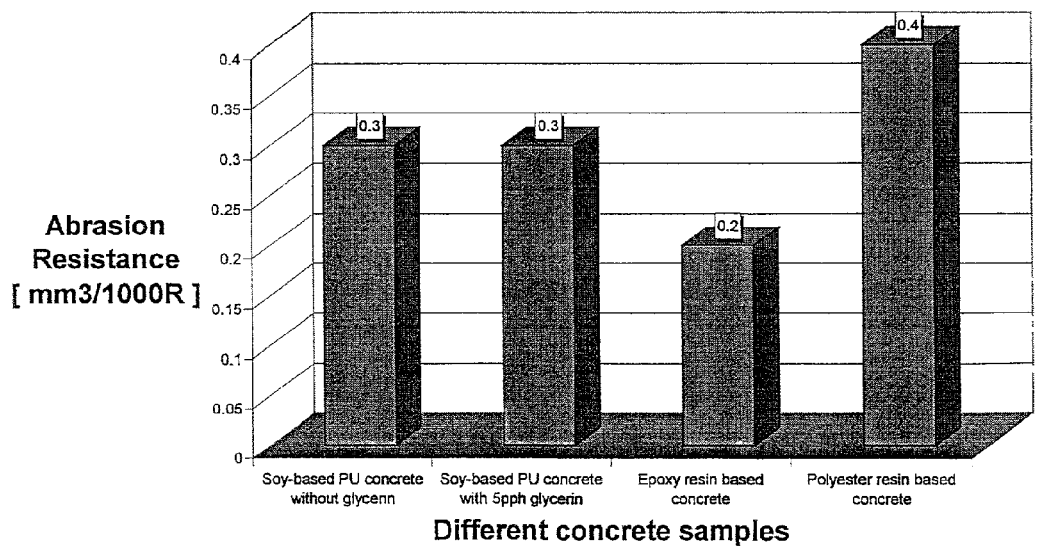
FIG. 30 is a bar graph comparing abrasion resistance for a variety of polymer concretes.

FIG. 30 provides the abrasion resistance results. The soy-based polyurethane samples performed equally well and exceeded the performance of the epoxy resin sample. The polyester resin performed best of all, though it is weaker in other respects.

EXAMPLE 21

Hydrolytic Stability

Figure 31:
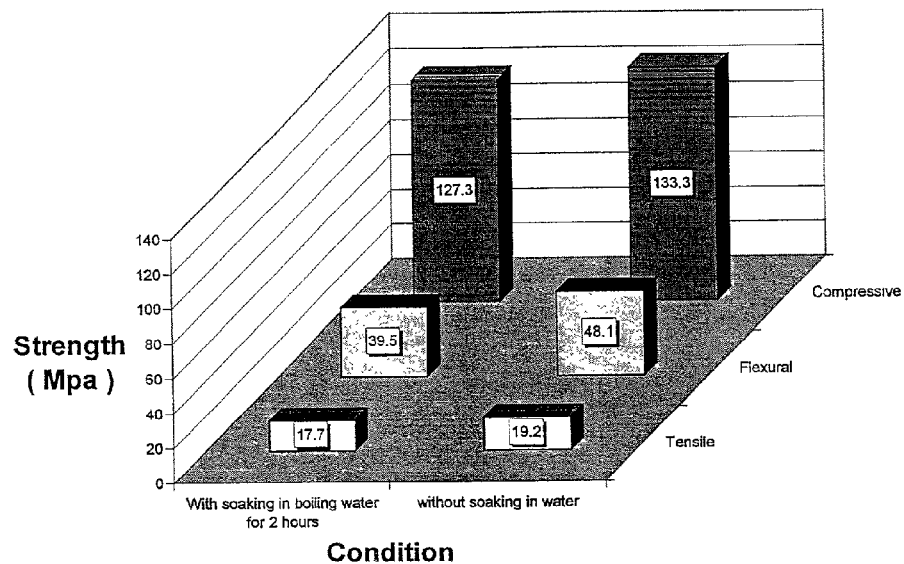
FIG. 31 is a bar graph of tensile, flexural, and compressive strength measurements in Mpa performed on soy-polyurethane concrete samples that were boiled in water versus those which were not boiled as an indicator of hydrolytic stability.

A series of soy-based polyurethane polymer concrete samples were prepared according to the procedure in Example 7 containing a resin binder comprising 15% of total weight of polymer concrete. The resin binder had 5 pph added glycerin. Aggregates comprised 85% of the total weight, and consisted of 15% fine powder and 85% sand in a 50/50 mixture of coarse sand and fine sand. This series of samples was separated into two groups. One group of the samples was soaked in boiling water for 2 hours. Another group was used as a control that was not exposed to boiling water. Testing of mechanical strengths on both groups was carried out according to the procedure described above, as to compressive, flexural, and tensile strengths, after a week of drying in open air. FIG. 31 presents the results The mechanical strength of soy-based polyurethane concrete was decreased with the soaking of these samples in boiling water for 2 hours. The largest decrease occurred in flexural strength, which was 18% lower than the samples without soaking in boiling water. Splitting tensile strength decreased 8%, and compressive strength decreased 5%.

EXAMPLE 22

Comparison Of Mechanical Properties Soy-Based Polyurethane Versus Conventional Concrete Four Soy-based polyurethane concretes were prepared to include 15% BMW resin and 85% aggregates of different composition. One composition included aggregate made of coarse sand in a resin without glycerine crosslinker. A second composition included aggregate made of coarse sand in a resin with 5 pph glycerine crosslinker by weight of the resin. A third composition included fine sand aggregate in a resin without crosslinker. A fourth composition included coarse sand aggregate in a resin having 5 pph glycerine by weight of the resin were selected to compare mechanical properties with those of high strength conventional concrete. A sample of high strength concrete having lime-based cement was also prepared. The mechanical properties of the samples were determined according to the procedure described above, as to density, splitting tensile strength, flexural strength, compressive strength, and abrasion resistance.

Figure 32:
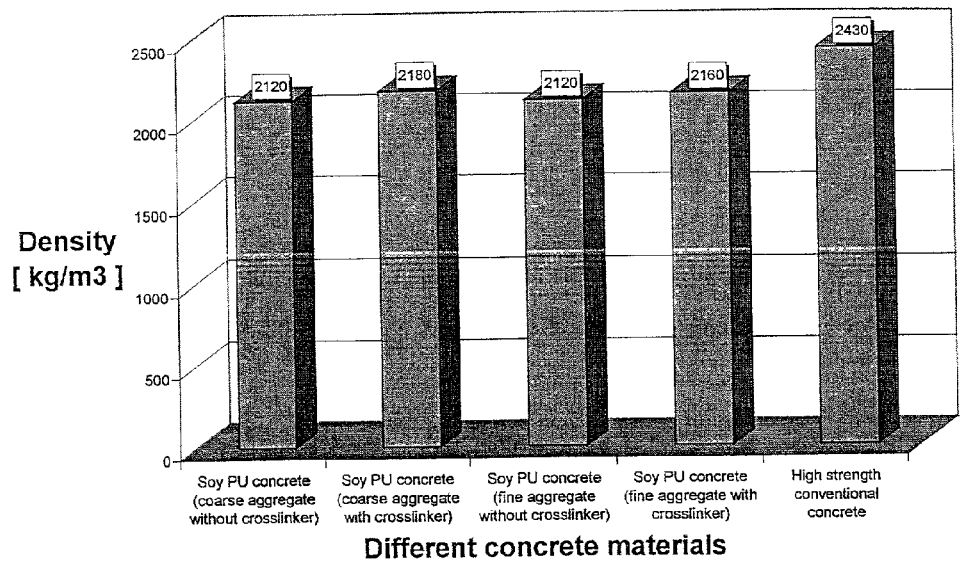
FIG. 32 is a bar graph comparing density in $kg/m^3$ for a variety of polymer concretes.

FIG. 32 provides a density comparison. The soy-based polyurethane samples range in density from 2120 kg/m$^3$ to 2180 kg/m$^3$, which compares to 2430 kg/m$^3$ for the conventional lime-based sample. Thus, the soy-based polyurethane concrete is up to 15% lighter than the conventional concrete.

Figure 33:
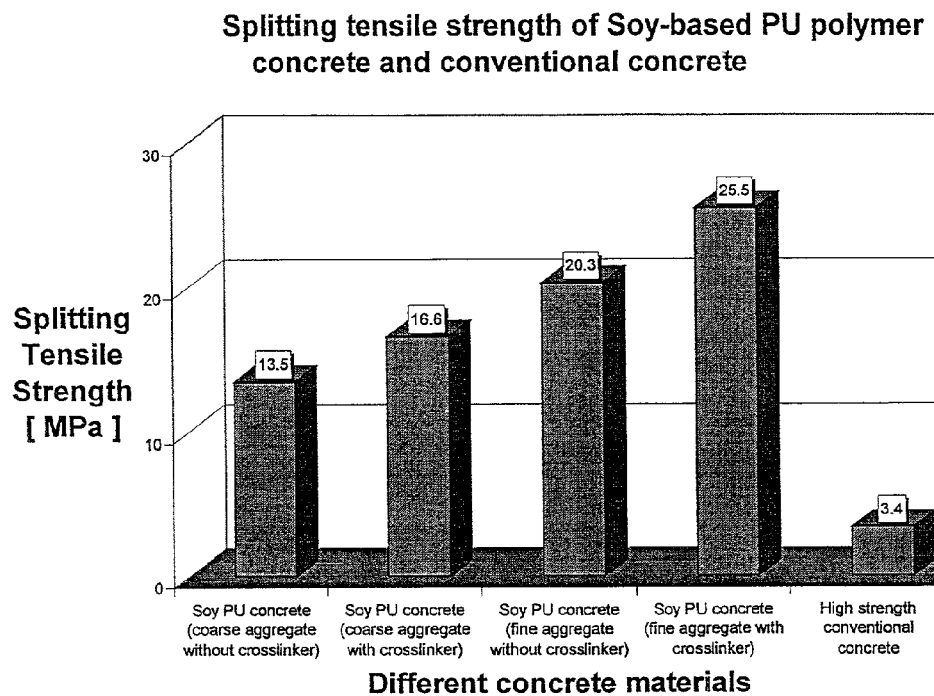
FIG. 33 is a bar graph of splitting tensile strength measurements in Mpa performed to compare the performance of various soy-polyurethane concrete samples in contrast to conventional high strength concrete having lime cement.
Figure 34:
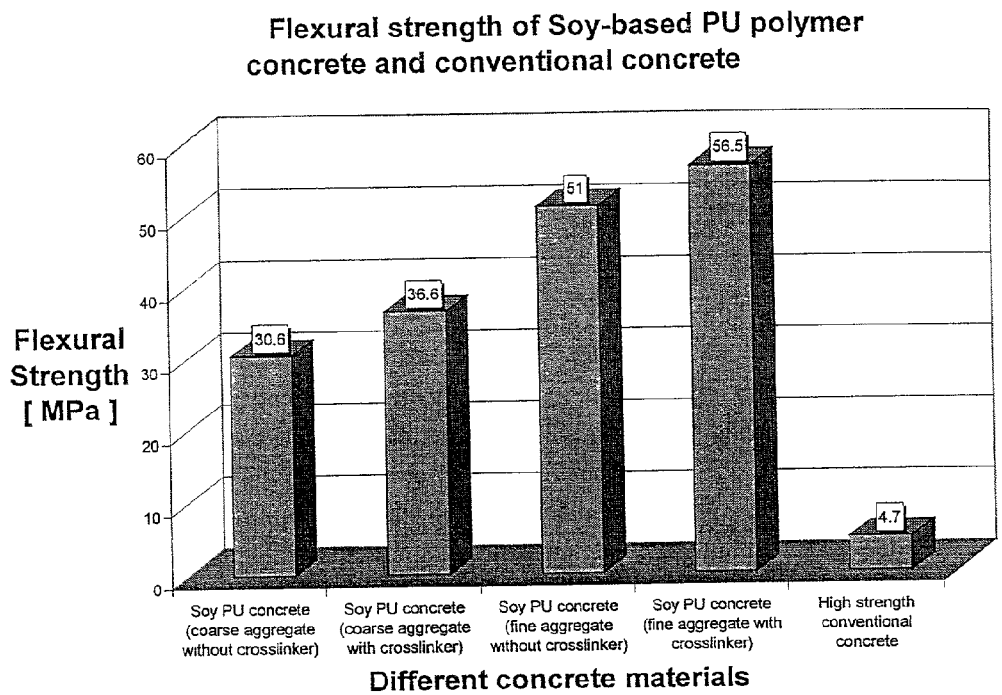
FIG. 34 is a bar graph of flexural strength measurements in Mpa performed to compare the performance of various soy-polyurethane concrete samples in contrast to conventional high strength concrete having lime cement.

FIG. 33 presents the results for splitting tensile strength measurements. The soy-based polyurethane concretes all exceed the splitting tensile strength of conventional concrete by at least about 300% with the best polyurethane concrete (fine aggregate with crosslinker) exceeding the performance of conventional concrete by 650%.

Figure 35:
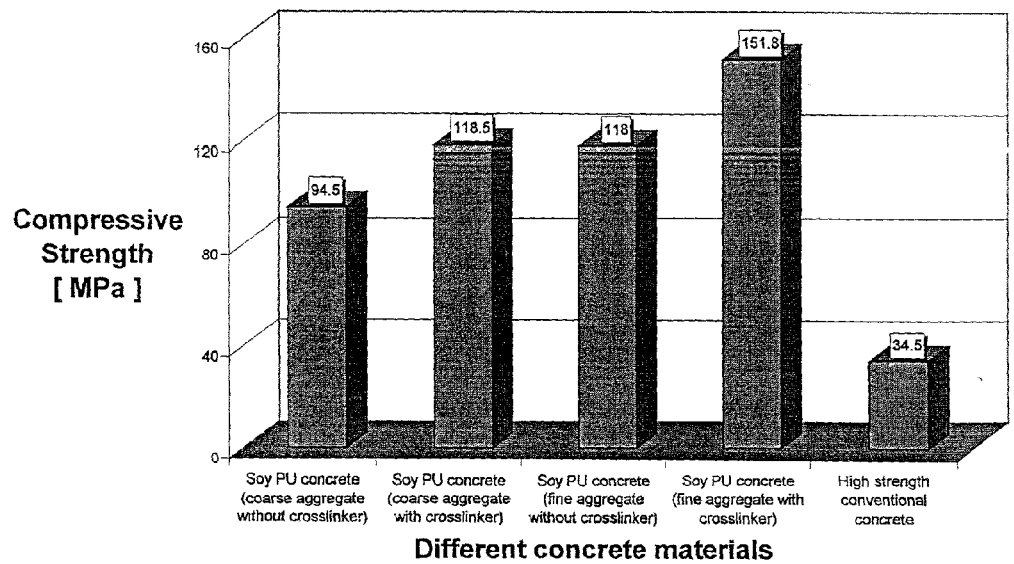
FIG. 35 is a bar graph of compressive strength measurements in Mpa performed to compare the performance of various soy-polyurethane concrete samples in contrast to conventional high strength concrete having lime cement.

FIG. 35 presents the results for compressive strength measurements. The soy-based polyurethane concretes all exceed the compressive strength of conventional concrete by at least about 170% with the best polyurethane concrete (fine aggregate with crosslinker) exceeding the performance of conventional concrete by 340%.

Figure 36:
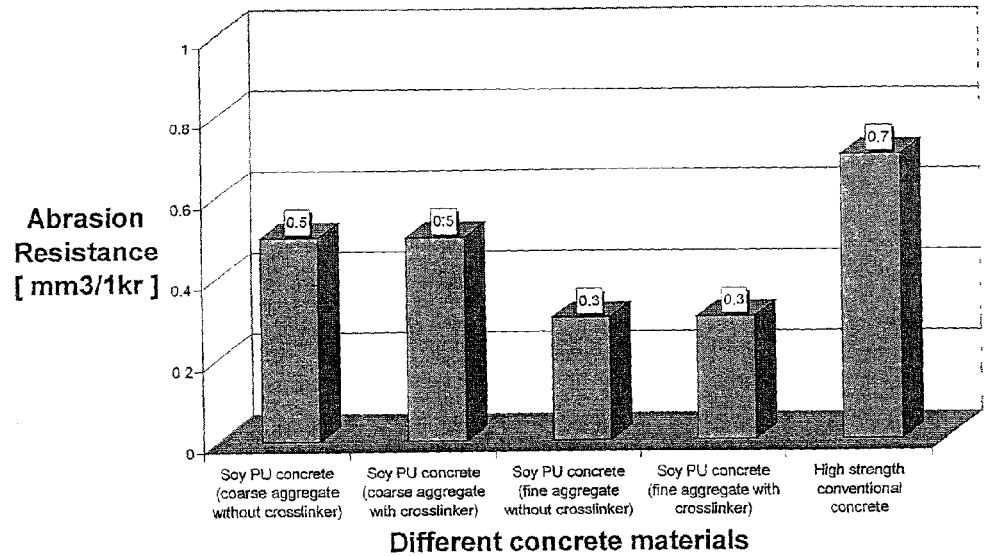
FIG. 36 is a bar graph of abrasion resistance measurements in Mpa performed to compare the performance of various soy-polyurethane concrete samples in contrast to conventional high strength concrete having lime cement.

FIG. 36 presents the results for abrasion resistance measurements. The soy-based polyurethane concretes were less hard than the conventional concrete, but the polyurethane samples were not so soft that their use would be precluded in the intended environment of use. The polyurethane samples with coarse aggregates tended to resist abrasion better than the fine aggregate samples.

The foregoing results and comparative analyses provide sufficient information to permit the selection and design of soy-based polyurethane concretes according to design specifications across a wide range of possible needs. For example, design and selection may be made according to tensile, compressive, and flexural strengths, as well as abrasion resistance, glass transition temperature, density, hardness, and curing time. Furthermore, sufficient information is provided to permit design choices based upon comparative analysis with respect to conventional concrete. Many advantages may be obtained by altering the amount of crosslinker in the resin, altering the soy-based polyol, and altering the aggregate composition according to the principles described above.

Thus, there has been shown and described a novel product associated with a soy-based polyurethane polymer concrete, which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

What is claimed is:

1. A polymer concrete composition comprising:
a cured polyurethane resin formed as a reaction product from a reaction mixture comprising at least one vegetable oil-based polyol, at least one isocyanate having at least two isocyanate moieties per molecule, and a crosslinker comprising glycerine, said glycerine being present in an amount ranging from 5 parts per hundred to 30 parts per hundred by weight of said at least one vegetable oil-based polyol; and
an aggregate composition bonded to the cured polyurethane resin,
the aggregate composition being present in an amount ranging from 70% to 90% by weight of the polymer concrete composition,
wherein said at least one vegetable oil-based polyol is prepared by:
(a) adding a peroxyacid to vegetable oil, wherein said peroxyacid and said vegetable oil react to form an epoxidized vegetable oil, and
(b) adding said epoxidized vegetable oil from step (a) to a mixture comprising an alcohol, water, and fluoboric acid, wherein said epoxidized vegetable oil reacts with said mixture to form said at least one vegetable oil-based polyol.

2. The polymer concrete composition of claim 1, wherein the vegetable oil-based polyol has on average at least three hydroxyl groups per polyol molecule.

3. The polymer concrete composition of claim 2, wherein the vegetable oil-based polyol has on average at least four hydroxyl groups per polyol molecule.

4. The polymer concrete composition of claim 2, wherein the vegetable oil-based polyol is essentially unsaturated.

5. The polymer concrete composition of claim 1, wherein the vegetable oil-based polyol has on average at least 3.9 hydroxyl groups per polyol molecule.

6. The polymer concrete composition of claim 5, wherein the vegetable oil-based polyol has a hydroxyl number ranging from 180 to 260, an epoxy number ranging from 0.02% to 0.03%, and a viscosity less than 15 pascal-seconds.

7. The polymer concrete composition of claim 5, wherein the vegetable oil-based polyol has a hydroxyl number ranging from 205 to 210.

8. The polymer concrete composition of claim 5, wherein the vegetable oil-based polyol has a viscosity less than 15 pascal-seconds.

9. The polymer concrete composition of claim 1, wherein the isocyanate comprises a diisocyanate.

10. The polymer concrete composition of claim 1, wherein the isocyanate in the reaction mixture comprises a stoichiometric excess amount of the isocyanate moieties in comparison to hydroxyl moieties in the vegetable oil-based polyol.

11. The polymer concrete composition of claim 10, wherein a ratio of isocyanate moieties in the isocyanate to hydroxyl moieties in the vegetable oil-based polyol ranges from 1.02 to 1.15.

12. The polymer concrete composition of claim 11, wherein the ratio ranges from 1.05 to 1.10.

13. The polymer concrete composition of claim 12 wherein the ratio is essentially 1.05.

14. The polymer concrete composition of claim 1, wherein the aggregate composition is selected from the group consisting of silica, fly ash, lime, sand, pea gravel, crushed rock, and mixtures thereof.

15. The polymer concrete composition of claim 1, wherein the aggregate composition is selected from the group consisting of (a) sand and (b) fly ash, silica, lime and mixtures thereof.

16. The polymer concrete composition of claim 15, wherein the group additionally consists of metal fines, glass fibers, synthetic fibers, glass reinforcing mats, glass strands, glass filaments, metal fibers, mineral powders, and mixtures thereof.

17. The polymer concrete composition of claim 15, wherein the aggregate composition contains from 10% to about 15% by weight of (b).

18. The polymer concrete composition of claim 1, wherein the aggregate composition comprises 25% or less of pea gravel by weight of the aggregate composition.

19. The polymer concrete composition of claim 1, wherein the aggregate composition comprises 25% or more of pea gravel by weight of the aggregate composition.

20. The polymer concrete composition of claim 1, wherein the aggregate composition comprises 50% or more of pea gravel by weight of the aggregate composition.

21. The polymer concrete composition of claim 1, wherein the aggregate composition comprises 75% or more of pea gravel by weight of the aggregate composition.

22. A polymer concrete composition comprising:
a cured polyurethane resin formed as a reaction product from a reaction mixture comprising at least one vegetable oil-based polyol, at least one isocyanate having at least two isocyanate moieties per molecule, and a crosslinker comprising a low molecular weight polyol, said low molecular weight polyol having a molecular weight less than one-half of the molecular weight of the vegetable oil-based polyol, and said low molecular weight polyol being present at from 1 pph to 10 pph based upon weight of said vegetable oil-based polyol; and
an aggregate composition bonded to the cured polyurethane resin, the aggregate composition being present in an amount ranging from 70% to 90% by weight of the polymer concrete composition,
wherein said at least one vegetable oil-based polyol is prepared by:
(a) adding a peroxyacid to vegetable oil, wherein said peroxyacid and said vegetable oil react to form an epoxidized vegetable oil, and
(b) adding said epoxidized vegetable oil from step (a) to a mixture comprising an alcohol, water, and fluoboric acid, wherein said epoxidized vegetable oil reacts with said mixture to form said at least one vegetable oil-based polyol.

23. The polymer concrete composition of claim 22, wherein the low molecular weight polyol comprises glycerin.

24. The polymer concrete composition of claim 1, wherein the reaction mixture comprises a catalyst in an amount effective for adjusting pot life of the reaction mixture to a predetermined value ranging between 10 minutes and 80 minutes at room temperature.

25. The polymer concrete composition of claim 1, wherein the reaction mixture comprises a catalyst in an amount effective for adjusting gel time of the reaction mixture to a predetermined value ranging between 10 minutes and 70 minutes at room temperature.

26. The polymer concrete composition of claim 1, comprising an organometallic catalyst present in an amount up to about 0.4% of the reaction mixture by weight.

27. The polymer concrete composition of claim 1, wherein the amount of cured polyurethane resin ranges between 10% and 20% of the polymer concrete composition by weight.

28. The polymer concrete composition of claim 27, wherein the amount of cured polyurethane resin ranges between 10% and 15% of the polymer concrete composition by weight.

29. The polymer concrete composition of claim 1, wherein the amount of cured polyurethane resin is essentially 15% of the polymer concrete composition by weight.

30. The polymer concrete composition of claim 1, wherein the amount of cured polyurethane resin ranges from 15% to 20% of the polymer concrete composition by weight.

31. A composition for preparing a polymeric concrete comprising:
  (a) 80% to 90% by weight of said composition of an aggregate composition;
  (b) 10% to 20% by weight of a polyurethane matrix prepared by contacting (i) a vegetable oil-based polyol having on average at least three hydroxyl groups per molecule, (ii) an isocyanate having on average at least two isocyanate groups per molecule, and (iii) 1 pph to 10 pph of a crosslinker based upon weight of the vegetable oil-based polyol, said crosslinker comprising a low molecular weight polyol, said low molecular weight polyol having a molecular weight less than one-half of the molecular weight of the vegetable oil-based polyol; and
  (c) 0% to 0.4% of a catalyst by weight of the vegetable oil-based polyol, wherein said at least one vegetable oil-based polyol is prepared by:
    (1) adding a peroxyacid to vegetable oil, wherein said peroxyacid and said vegetable oil react to form an epoxidized vegetable oil, and
    (2) adding said epoxidized vegetable oil from step (1) to a mixture comprising an alcohol, water, and fluoboric acid, wherein said epoxidized vegetable oil reacts with said mixture to form said at least one vegetable oil-based polyol.

32. The composition of claim 31, the crosslinker being a triol present in an amount ranging between 5 pph and 10 pph by weight of the vegetable oil-based polyol.

33. The composition of claim 32, the triol comprising glycerine.

34. The composition of claim 31, the catalyst being present in an amount ranging between 0.1% and 0.4% by weight by weight of the vegetable oil-based polyol.

35. The composition of claim 31 wherein the vegetable oil-based polyol comprises soy-based polyol.

36. The composition of claim 31, wherein the aggregate composition is selected from the group consisting of (a) sand and (b) fly ash, silica, lime and mixtures thereof.

37. The composition of claim 36, wherein the group additionally consists of metal fines, glass fibers, synthetic fibers, glass reinforcing mats, glass strands, glass filaments, metal fibers, mineral powders, and mixtures thereof.

38. The composition of claim 36, wherein the aggregate composition contains from 10% to 15% by weight of (b).

39. The composition of claim 31, wherein the aggregate composition comprises 25% or less of pea gravel by weight of the aggregate composition.

40. The composition of claim 31, wherein the aggregate composition comprises 25% or more of pea gravel by weight of the aggregate composition.

41. The composition of claim 31, wherein the aggregate composition comprises 50% or more of pea gravel by weight of the aggregate composition.

42. The composition of claim 31, wherein the aggregate composition comprises 75% or more of pea gravel by weight of the aggregate composition.

43. A method for preparing a polyurethane polymer concrete from a vegetable oil-based polyol comprising:
  (a) admixing:
    (1) the vegetable oil-based polyol,
    (2) an aggregate composition, and
    (3) an isocyanate having at least two -NCO moieties per isocyanate molecule
    (4) a crosslinker comprising a low molecular weight polyol, said low molecular weight polyol having a molecular weight less than one-half of the molecular weight of the vegetable oil-based polyol, and being present at from 1 pph to 10 pph based upon weight of said vegetable oil-based polyol,
  in a reaction vessel under conditions to form an admixture that contains from 70% to 90% by weight of the aggregate composition; and
  (b) curing the admixture,
  wherein said vegetable oil-based polyol is prepared by adding a peroxyacid to vegetable oil, wherein said peroxyacid and said vegetable oil react to form an epoxidized vegetable oil, and adding said epoxidized vegetable oil to a mixture comprising an alcohol, water, and fluoboric acid, wherein said epoxidized vegetable oil reacts with said mixture to form said at least one vegetable oil-based polyol.

44. The method of claim 43 further comprising, after said admixing in step (a), removing air bubbles from the admixture by applying a vacuum to the reaction vessel.

45. The method of claim 43 further comprising holding the admixture for a period of time prior to the curing step.

46. The method of claim 43, wherein the curing step is performed under ambient conditions.

47. The method of claim 43, wherein the curing step is performed-under an elevated temperature with respect to ambient conditions.

48. The method of claim 43, wherein the vegetable oil-based polyol used in the admixing step has on average at least three hydroxyl groups per polyol molecule.

49. The method of claim 48 wherein the vegetable oil-based polyol used in the admixing step is a hydroxylated derivative of a vegetable oil selected from the group consisting of soybean oil, safflower oil, linseed oil, corn oil, sunflower oil, canola oil, cottonseed oil, rapeseed oil, tung oil, peanut oil, fish oil or mixtures thereof.

50. The method of claim 43, wherein the vegetable oil-based polyol used in the admixing step has on average at least four hydroxyl groups per polyol molecule.

51. The method of claim 43, wherein the vegetable oil-based polyol used in the admixing step is a soy-based polyol.

52. The method of claim 51, wherein the soy-polyol has a hydroxyl number of about 180 to 260, an epoxy number of 0.02% to 0.03%, and a viscosity less than 15 pascal-seconds.

53. The method of claim 52, wherein said soy-polyol has a hydroxyl number of 205 to 150.

54. The method of claim 43, wherein the isocyanate used in the step of admixing is a diisocyanate.

55. The method of claim 43, wherein the admixture in the admixing step has a ratio of equivalents of isocyanate moieties in the isocyanate to equivalents of hydroxyl moieties in the vegetable oil-based polyol ranging from 1.02 to about 1.15.

56. The method of claim 55, wherein the ratio is from 1.05 to 1.10.

57. The method of claim 56, wherein ratio is about 1.05.

58. The method of claim 43, wherein the aggregate composition used in the admixing step is selected from the group consisting of comprises silica, fly ash, lime, sand, pea gravel, crushed stone or rock, and mixtures.

59. The method of claim 43, wherein the aggregate composition used in the step of admixing comprises 25% or less of pea gravel by weight of the aggregate composition.

60. The method of claim 43, wherein the aggregate composition used in the step of admixing comprises 25% or more of pea gravel by weight of the aggregate composition.

61. The method of claim 43, wherein the aggregate composition used in the step of admixing comprises 50% or more of pea gravel by weight of the aggregate composition.

62. A method for preparing a polyurethane polymer concrete from a vegetable oil-based polyol comprising:
 (a) admixing:
  (1) the vegetable oil-based polyol,
  (2) an aggregate composition, and
  (3) an isocyanate having at least two —NCO moieties per isocyanate molecule
  (4) a crosslinker comprising glycerin in an amount ranging from 5 parts per hundred to 30 parts per hundred by weight of the vegetable oil-based polyol, in a reaction vessel under conditions to form an admixture that contains from 70% to 90% by weight of the aggregate composition; and
 (b) curing the admixture,
 wherein said vegetable oil-based polyol is prepared by adding a peroxyacid to vegetable oil, wherein said peroxyacid and said vegetable oil react to form an epoxidized vegetable oil, and adding said epoxidized vegetable oil to a mixture comprising an alcohol, water, and fluoboric acid, wherein said epoxidized vegetable oil reacts with said mixture to form said at least one vegetable oil-based polyol.

63. The method of claim 62, wherein the crosslinker comprises glycerin in an amount ranging from 15 parts per hundred to 25 parts per hundred by weight of the vegetable oil-based polyol.

64. The method of claim 62, wherein the crosslinker comprises glycerin in an amount ranging from 5 part per hundred to 10 parts per hundred by weight of the vegetable oil-based polyol.

65. The method of claim 43, wherein the admixing step is carried out by admixing a catalyst in an amount effective for adjusting pot life of the reaction mixture to a predetermined value ranging between 10 minutes and 80 minutes at room temperature.

66. The method of claim 43, wherein the admixing step is carried out by admixing a catalyst in an amount effective for adjusting gel time of the reaction mixture to a predetermined value ranging between 10 minutes and 70 minutes at room temperature.

67. The method of claim 43, wherein the admixing step is carried out by admixing an organometallic catalyst present in an amount up to about 0.4% of the reaction mixture by weight.

68. The method of claim 43, wherein the admixing step is carried out by admixing the polyurethane resin in an amount ranging from 10% to 20% of the polymer concrete composition by weight.

69. The method of claim 43, wherein the admixing step is carried out by admixing the polyurethane resin in an amount ranging from 10% to 15% of the polymer concrete composition by weight.

70. The method of claim 43, wherein the admixing step is carried out by admixing the polyurethane resin in an amount that is essentially 15% of the polymer concrete composition by weight.

71. The method of claim 43, wherein the admixing step is carried out by admixing the polyurethane resin in an amount ranging from 15% to 20% of the polymer concrete composition by weight.

72. The method of claim 43 further comprising a step of exposing the admixture to vacuum to remove gas pockets from the admixture.

73. The method of claim 43, wherein the admixing step further comprises a step of adding water to generate foam in the admixture.

* * * * *